(12) United States Patent
Tsukamoto et al.

(10) Patent No.: US 11,930,798 B2
(45) Date of Patent: Mar. 19, 2024

(54) FISHING ROD COMPRISING MULTIPLE JOINTED ROD BODIES

(71) Applicant: GLOBERIDE, Inc., Tokyo (JP)

(72) Inventors: Yasuhiro Tsukamoto, Tokyo (JP); Atsushi Saito, Tokyo (JP); Masayoshi Nakao, Tokyo (JP); Kenji Kato, Tokyo (JP); Isao Oota, Tokyo (JP)

(73) Assignee: Globeride, Inc., Tokyo (JP)

( * ) Notice: Subject to any disclaimer, the term of this patent is extended or adjusted under 35 U.S.C. 154(b) by 373 days.

(21) Appl. No.: 17/276,515

(22) PCT Filed: Oct. 25, 2019

(86) PCT No.: PCT/JP2019/041888
§ 371 (c)(1),
(2) Date: Mar. 16, 2021

(87) PCT Pub. No.: WO2020/090650
PCT Pub. Date: May 7, 2020

(65) Prior Publication Data
US 2022/0030841 A1   Feb. 3, 2022

(30) Foreign Application Priority Data

Oct. 29, 2018  (JP) ................................. 2018-202757
Dec. 26, 2018  (JP) ................................. 2018-243805
Jan. 16, 2019  (JP) ................................. 2019-004805

(51) Int. Cl.
*A01K 87/02*   (2006.01)
*A01K 87/04*   (2006.01)

(52) U.S. Cl.
CPC .............. *A01K 87/02* (2013.01); *A01K 87/04* (2013.01)

(58) Field of Classification Search
CPC ....... A01K 87/02; A01K 87/025; A01K 87/00
(Continued)

(56) References Cited

U.S. PATENT DOCUMENTS 613,903 A * 11/1898 Hussey ................... F16G 11/12
294/99.1
1,351,473 A * 8/1920 Forster ................... A01K 87/00
43/18.1 R
(Continued)

FOREIGN PATENT DOCUMENTS

CN         1498530 A  *  5/2004  ............ A01K 87/02
FR         1127923 A  *  12/1956
(Continued)

OTHER PUBLICATIONS

Translation of KR 20090072081 A (Year: 2007).*
(Continued)

*Primary Examiner* — Darren W Ark
*Assistant Examiner* — Katelyn T Truong
(74) *Attorney, Agent, or Firm* — Oliff PLC

(57) ABSTRACT

A fishing rod includes a hollow rod extending along a central axis; and a shaft member with an outer peripheral surface inclined relative to the central axis inserted into the rod from the one end, and that is supported by an inner peripheral surface of the rod at a support position on another end side of the one end in an axial direction along the central axis, wherein the inner peripheral surface of the rod has at least one convex portion protruding toward the central axis from a virtual curve between the support position and the one end position axially when drawing a virtual curve that is convex toward the central axis through the support position and the one end position at the end of the end side of the inner peripheral surface in an area radially outward from the outer peripheral surface of the shaft member.

13 Claims, 25 Drawing Sheets

(58) Field of Classification Search
USPC .......... 403/292, 298, 345, 359.1; 43/18.1 R, 43/18.1 CT
See application file for complete search history.

(56) References Cited

U.S. PATENT DOCUMENTS

| | | | | | |
|---|---|---|---|---|---|
| 1,932,427 | A | * | 10/1933 | Stone | E21B 17/08 |
| | | | | | 285/334 |
| 2,018,923 | A | * | 10/1935 | Potter | A01K 87/00 |
| | | | | | 43/18.1 R |
| 3,830,008 | A | * | 8/1974 | Johnson | A01K 87/02 |
| | | | | | 403/361 |
| 4,070,127 | A | * | 1/1978 | Loomis | A01K 87/02 |
| | | | | | 43/18.5 |
| 4,178,713 | A | * | 12/1979 | Higuchi | A01K 87/00 |
| | | | | | 428/36.1 |
| 5,165,816 | A | * | 11/1992 | Parasin | F16B 5/0012 |
| | | | | | 52/592.4 |
| 5,411,347 | A | * | 5/1995 | Bowmer | E04C 5/165 |
| | | | | | 52/848 |
| 5,924,235 | A | * | 7/1999 | McCulley | A01K 87/02 |
| | | | | | 43/18.5 |
| 2013/0039692 | A1 | * | 2/2013 | Rutledge | F04B 53/14 |
| | | | | | 403/345 |
| 2021/0051934 | A1 | | 2/2021 | Tsukamoto et al. | |

FOREIGN PATENT DOCUMENTS

| | | | |
|---|---|---|---|
| JP | H05-068270 | | 3/1993 |
| JP | 2001-095432 | | 4/2001 |
| JP | 2003-250396 | | 9/2003 |
| JP | 2006288236 | A | 10/2006 |
| JP | 2007-259741 | | 10/2007 |
| JP | 4311599 | | 8/2009 |
| JP | 6392705 | | 9/2018 |
| KR | 960006122 | Y1 | 7/1996 |
| KR | 200186643 | Y1 * | 6/2000 |
| KR | 20040044107 | A * | 5/2004 |
| KR | 20060107898 | A * | 10/2006 |
| KR | 20090072081 | A * | 12/2007 |
| WO | 2005/086996 | | 9/2005 |
| WO | 2019/189907 | | 10/2019 |

OTHER PUBLICATIONS

Office Action for related Chinese Application No. 201980056518.8; action dated Jan. 18, 2022; (14 pages).
Examination Report for related Australian Application No. 2019372611; action dated Mar. 2, 2022; (5 pages).
Second Office Action and English translation for related Chinese Application No. 201980056518.8; action dated Aug. 3, 2022; (6 pages).
Extended European Search Report for related European Application No. 19878133.8; action dated Jun. 27, 2022; (6 pages).
U.S. Niswander; U.S. Pat. No. 230,650A which issued August 3, 1880 (2 pages).
International Preliminary Report on Patentability for related International Application No. PCT/JP2019/041888; action dated Apr. 27, 2021; (11 pages).

* cited by examiner

B-B Cross Section

C-C Cross Section

FISHING ROD COMPRISING MULTIPLE JOINTED ROD BODIES

TECHNICAL FIELD

This disclosure relates to a fishing rod with a plurality of rod bodies jointed together, and a socket-and-spigot jointed type fishing rod and an ordinarily jointed type fishing rod in which a plurality of rods are jointed into a socket-and-spigot joint structure or ordinary joint structure.

BACKGROUND

In a socket-and-spigot jointed type fishing rod, a hollow small-diameter rod body and a hollow large-diameter rod body are connected by a socket-and-spigot core member. A conventional socket-and-spigot jointed type fishing rod is disclosed in, for example, Japanese Patent Application Publication No. 2003-250396. In the socket-and-spigot jointed type fishing rod, one end of the socket-and-spigot core member is fixed to the tip-side end of the large-diameter rod body by bonding or the like, and a portion of the socket-and-spigot core member protruding from the tip-side end is inserted into the small-diameter rod body from the rear end (proximal end), whereby the small-diameter rod body and the large-diameter rod body are connected by the socket-and-spigot core member.

In the socket-and-spigot joint, the rear end opening of the small-diameter rod is press-fitted into a portion protruding from the distal end opening of the large-diameter rod, and fixed at any position on the outer peripheral surface thereof, whereby the small-diameter rod and the large-diameter rod are connected. Thus, as disclosed in Japanese Utility Patent Application Publication No. H05-068270, if a soft material is filled in a stress distribution void part formed on the inner peripheral surface of the rear end of the small-diameter rod or the wall thickness of the portion is increased, rigidity increases around the joint area, which lowers the flexibility. Further, in the event at the time of actual fishing, a fish is hooked and a large deflection occurs to the fishing rod, the outer peripheral surface of the socket-and-spigot joint is subjected to great pressure at the rising portion of the taper, and large stress concentration occurs in a ring shape at the position at which the press-fitted small-diameter rod is fixed (the rising portion of the taper), which causes a problem that the socket-and-spigot joint is prone to breakage at said position.

Further, if a soft material is filled, it separates or generates resistance when the small-diameter rod is inserted or removed, which destabilizes the inserting and removing operations. That is, when the soft material separates, the position to which the socket-and-spigot joint is fitted tends to vary, and when the soft material is filled, resistance occurs when the rod is press-fitted, whereby the small-diameter rod does not tightly fit on the outer peripheral surface of the socket-and-spigot joint, and the fitted and fixed position is also unstable.

When a socket-and-spigot jointed type fishing rod bends, at the rear end of the small-diameter rod body, stress arising from the inner periphery of the small-diameter rod body concentrates on the socket-and-spigot core member. Due to the stress concentration, the socket-and-spigot core member is prone to breakage during the use of the fishing rod.

Similar problems also occur to an ordinarily jointed type fishing rod. That is, in the ordinarily jointed type fishing rod, since the small-diameter rod body with a small diameter is inserted into the large-diameter rod body with a large diameter, stress is likely to concentrate at a position of the small-diameter rod body that is in contact with the inner peripheral surface of the large-diameter rod body when the fishing rod bends. Therefore, a portion of the small-diameter rod body inserted into the large-diameter rod body is prone to breakage.

It could therefore be helpful to suppress breakage at the joint of rod bodies.

Further, with respect to the socket-and-spigot joint, the rear end opening of the small-diameter rod is press-fitted into a portion protruding from the tip opening of the large-diameter rod, and is fixed at any position on the outer peripheral surface thereof, thereby connecting the small-diameter rod and the large-diameter rod. Thus, as disclosed in Japanese Utility Patent Application Publication No. H05-068270, if a soft material is filled in a stress distribution void part formed on the inner peripheral surface of the rear end of the small-diameter rod or the wall thickness of the portion is increased, rigidity increases around the joint area, which lowers the flexibility. Further, in the event at the time of actual fishing, a fish is hooked and a large deflection occurs to the fishing rod, the outer peripheral surface of the socket-and-spigot joint is subjected to great pressure at the rising portion of the taper, and large stress concentration occurs in a ring shape at the position at which the press-fitted small-diameter rod is fixed (the rising portion of the taper), thereby causing a problem that the socket-and-spigot joint is susceptible to breakage at said position.

Further, if a soft material is filled, it separates or generates resistance when the small-diameter rod is inserted or removed, which destabilizes the inserting/removing operations. That is, when the soft material separates, the position of the socket-and-spigot joint to which the rod is fitted tends to vary, and when the soft material is filled, resistance occurs when the rod is press-fitted, whereby the small-diameter rod does not tightly fit on the outer peripheral surface of the socket-and-spigot joint, and the fitted and fixed position is also unstable.

There is thus a need to provide a socket-and-spigot jointed type fishing rod that can alleviate stress concentration on the socket-and-spigot joint, and that allows stable insertion and removal of the small-diameter rod into and from the socket-and-spigot joint. Further, there is a need to provide an ordinarily jointed type fishing rod that can alleviate stress concentration on the joint to allow stable insertion and removal of the small-diameter rod into and from the large-diameter rod.

SUMMARY

We thus provide:

A fishing rod includes: a hollow rod body extending from one end to the other along a central axis; and a shaft member having an outer peripheral surface inclined with respect to the central axis, inserted into the rod body from the one end, and supported on the inner peripheral surface of the rod body at a support position located on the other end of the one end in the axial direction along the central axis. In the example, when drawing, in an area radially outward from the outer peripheral surface of the shaft member, an virtual curve that is convex toward the central axis through the support position and the one end position that is the end of the one end side of the inner peripheral surface, the inner peripheral surface of the rod body has at least one convex portion protruding toward the central axis from the virtual curve between the support position and the one end position in the axial direction.

The inner peripheral surface of the rod body may have a plurality of convex portions protruding toward the central axis from the virtual curve between the support position and the one end position in the axial direction.

The inner peripheral surface of the rod body may have at least one concave portion that is concave toward the opposite side of the central axis from the virtual curve between the support position and the one end position in the axial direction.

The inner peripheral surface of the rod body may have a plurality of concave portions that is concave toward the opposite side of the central axis from the virtual curve between the support position and the one end position in the axial direction.

A line between the one end position on the inner peripheral surface and the support position may be inclined with respect to the central axis at an angle greater than the angle between the outer peripheral surface and the central axis.

The one end position on the inner peripheral surface may be located radially outward from the support position.

The inner peripheral surface of the rod body may have a parallel surface extending from the support position to the other end side in parallel or substantially parallel with the central axis. The rod body may have: a stress relieving layer containing first reinforced fibers that is provided on the radially innermost side; and a body layer containing second reinforced fibers that is provided radially outward from the stress relieving layer, wherein the tensile modulus of elasticity of the first reinforced fibers is smaller than that of the second reinforced fibers.

A fishing rod includes: a hollow rod body extending from one end to the other end along a central axis, and a shaft member having an outer peripheral surface inclined at the first angle with respect to the central axis and inserted into the rod body from the one end. The inner peripheral surface of the rod body includes: a first surface extending at an angle greater than the first angle with respect to the central axis from the one end to the first position in the axial direction; a second surface extending from the first position to the second position on the other end side of the first position; a third surface extending from the second position to the third position on the other end side of the second position in parallel or substantially parallel with the central axis. The second surface has: an inclined portion that is continuous with the first surface and that is inclined at an angle greater than the first angle with respect to the central axis; and a non-inclined portion that is continuous with the third surface and that extends in parallel or substantially parallel with the central axis.

The circumferential length around the central axis at the first position of the non-inclined portion may be 50% or more of the total length of the inner peripheral surface at the second position.

The length of the first surface in the central axis direction may be equal to or greater than the length of the second surface in the central axis direction.

A fishing rod may further include a fishing line guide provided on the outer peripheral surface of the rod body. The inclined portion may be provided on the opposite side of the fishing line guide position in the circumferential direction around the central axis.

The inclined portion may be provided on the same side as the fishing line guide position in the circumferential direction around the central axis.

The shaft member may be a socket-and-spigot core member.

The shaft member may be another rod body with a diameter smaller than that of the rod body.

Our rods may be characterized in that, in a socket-and-spigot jointed type fishing rod that detachably joints a large-diameter rod and a small-diameter rod with a socket-and-spigot joint, on the rear end side of the small-diameter rod, the inner peripheral surface of the opening formed having a rising position that rises from the outer peripheral surface of the socket-and-spigot joint is fitted on and fixed to the outer peripheral surface of the socket-and-spigot joint, and on said inner peripheral surface of the opening, a rough surface portion is formed that is provided with micro irregularities protruding in the radial direction over the circumferential direction at least around the rising position and/or a large number of micro grooves extending in the axial direction over the circumferential direction.

In the socket-and-spigot jointed type fishing rod having the above-described configuration, an opening on the rear end side of the small-diameter rod is press-fitted on the outer peripheral surface of the socket-and-spigot joint, whereby the small-diameter rod and the large-diameter rod are connected. In this example, large stress concentration occurs in a ring shape on the outer peripheral surface of the socket-and-spigot joint at a position to which the small-diameter rod is press-fitted and fixed, which makes the socket-and-spigot joint prone to breakage. However, in the above-mentioned configuration, since a rough surface portion is formed in the area of the rising position that rises from the outer peripheral surface of the socket-and-spigot joint on the inner peripheral surface of the opening on the rear end side of the small-diameter rod, the rough surface portion deforms when the small-diameter rod bends, which alleviates the impact (stress concentration) on the outer peripheral surface of the socket-and-spigot joint, and can prevent breakage at the socket-and-spigot joint. That is, formation of the above-described rough surface portion can alleviate the impact (stress acting in a ring shape) on the outer peripheral surface of the socket-and-spigot joint at the rising position (edge), which suppresses the bending and shearing stresses.

Further, since such rough surface portion is formed in the area of the rising position where the joint is actually performed, it is possible to correctly adjust the position when press-fitting and fixing the small-diameter rod and to prevent the rod from getting stuck to the joint, to smoothly insert or remove the small-diameter rod and to maintain the stability of the fitted and fixed position.

The above-mentioned rough surface portion suffices to include at least either of micro irregularities protruding in the radial direction over the circumferential direction and a large number of micro grooves extending in the axial direction over the circumferential direction. The former micro irregularities deform to squash with respect to the outer peripheral surface when the small-diameter rod bends to relieve stress, and the latter large number of micro grooves can accommodate the deformation of the surface area when a pressure acts to relieve stress. Though it is preferable to form such a rough surface portion over the entire circumferential periphery, it also suffices that the rough surface portion is formed within a certain range in the circumferential direction in which large stress acts when the rod bends.

The above-mentioned joint structure with a rough surface portion can also be applied to an ordinarily jointed type fishing rod. An ordinarily jointed type fishing rod has a structure in which the rear end of the small-diameter rod is press-fitted and fixed to the inner peripheral surface of the opening on the distal end side of the large-diameter rod, but it suffices that a rough surface portion is formed, in the area of a rising position formed on the inner peripheral surface of the opening on the distal end side of the large-diameter rod, that has micro irregularities protruding in the radial direction over the circumferential direction and/or a large number of micro grooves extending in the axial direction over the circumferential direction.

It is thus possible to suppress breakage at the joint of a rod body.

Further, it is possible to provide an a socket-and-spigot jointed type fishing rod that can alleviate stress concentration on the socket-and-spigot joint, and that allows stable insertion and removal of the small-diameter rod into and from the socket-and-spigot joint.

BRIEF DESCRIPTION OF THE DRAWINGS

FIG. 5a illustrates an arrangement of the outer peripheral surface of the shaft member with respect to the inner peripheral surface of the large-diameter rod when the fishing rod is not bent.

FIG. 5b illustrates an arrangement of the outer peripheral surface of the shaft member with respect to the inner peripheral surface of the large-diameter rod when the fishing rod bends.

FIG. 5c shows an arrangement of the outer peripheral surface of the shaft member with respect to the inner peripheral surface of the large-diameter rod body when the fishing rod further bends.

Figure 1:
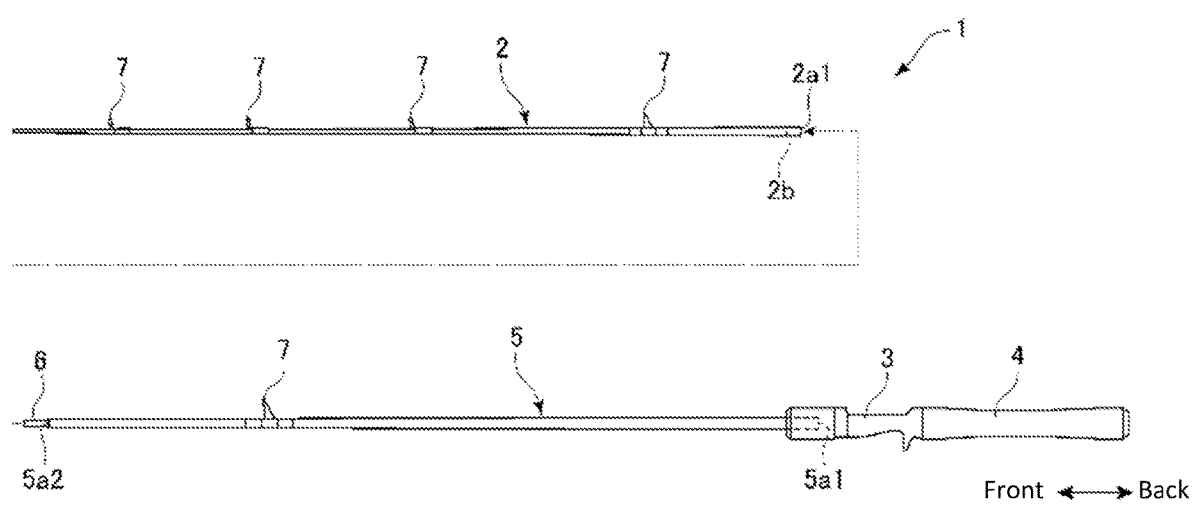
FIG. 1 shows a schematic diagram illustration a fishing rod according to an example.

DESCRIPTION OF THE NUMERICAL REFERENCES 1, 101 Fishing rod
2, 105 Tip rod
2b1 Inclined surface
2b2 Stress relieving surface
2b3 Cylindrical surface
5, 102 Hand rod
6 Socket-and-spigot core member
10 Base rod
18 Non-inclined portion
20, 30 Middle rod
21 Stress relieving layer
21A1 Inclined surface
21A2 Parallel surface
21a, 21b, 21c and 21d Inclined portion
22 Main body protection layer
23 Main body layer
24 Protection layer
31A Inclined surface
40 Tip rod
80 Socket-and-spigot joint 121a, 121b, 121c and 121d Inclined portion
122 Non-inclined portion
P1 Rising position

DETAILED DESCRIPTION

Hereinafter, various examples will be described with reference to drawings as appropriate. Components common in the respective drawings are denoted by the same reference numerals. Each of the drawings is not necessarily scaled for convenience of explanation.

Figure 2:
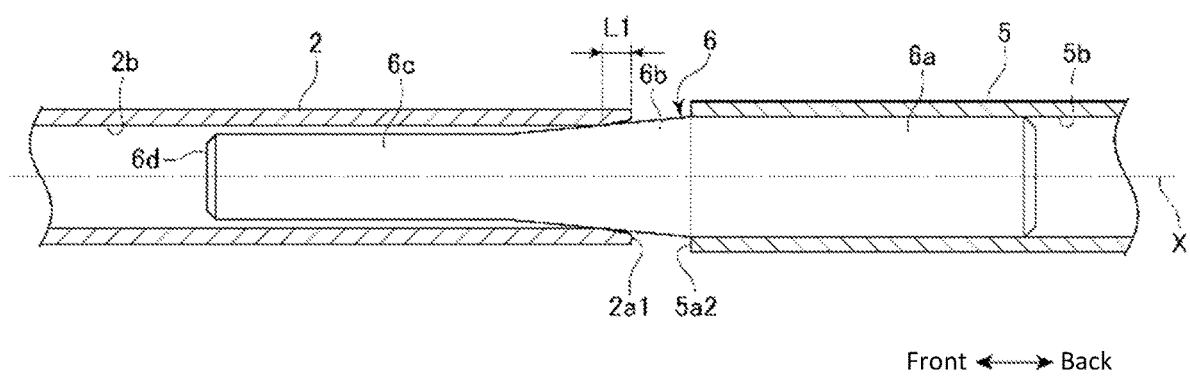
FIG. 2 shows a cross section diagram schematically illustrating a joint structure of a large-diameter rod body and a small-diameter rod body included in the fishing rod in FIG. 1.
Figure 3:
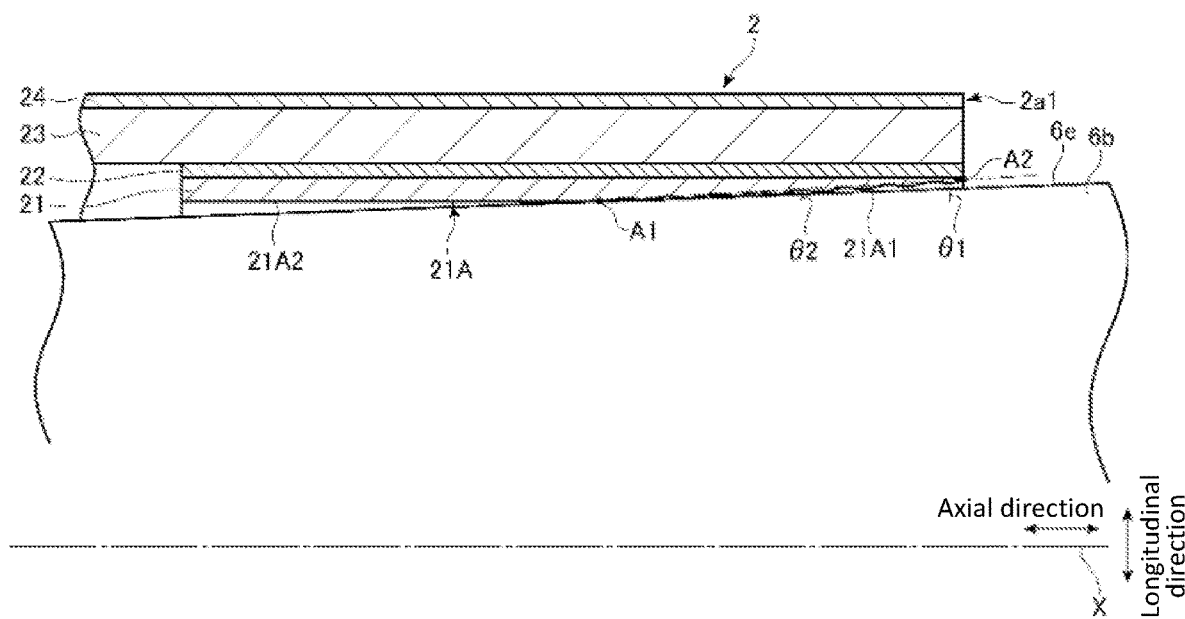
FIG. 3 shows a schematic diagram illustrating the enlarged joint structure shown in FIG. 2.
Figure 4:
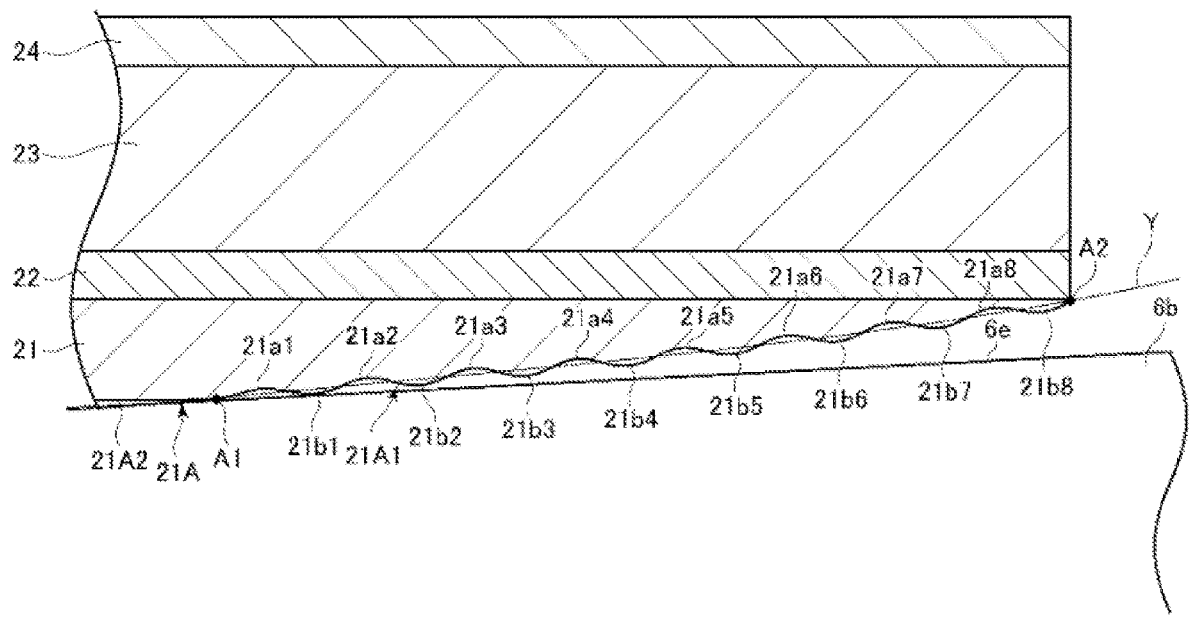
FIG. 4 shows a schematic diagram illustrating the shape of the inner peripheral surface of the small-diameter rod in FIG. 1.

An example of our fishing rod 1 will be described with reference to FIGS. 1 to 4. FIG. 1 is a schematic diagram illustrating a socket-and-spigot jointed type fishing rod 1. FIG. 2 is a cross section diagram schematically illustrating a joint structure between a hand rod 5, which is an example of a large-diameter rod body, and a tip rod 2, which is an example of a small-diameter rod body, in the fishing rod 1, FIG. 3 is a schematic diagram illustrating the enlarged joint structure shown in FIG. 2, and FIG. 4 is a schematic diagram illustrating the shape of the inner peripheral surface of the tip rod 2 in FIG. 1.

As illustrated, the fishing rod 1 has the tip rod 2 and the hand rod 5 joined to the tip rods 2. Both the tip rod 2 and the hand rod 5 are hollow tube-shaped, extending along the central axis X. The direction along the central axis X is sometimes called the axial direction or the central axis direction, the direction extending perpendicularly to the central axis X from the central axis X is sometimes called the radial direction. The tip rod 2 extends from its rear end 2a1 to its front end 2a2. The hand rod 5 extends from its rear end 5a1 to its front end 5a2. The tip rod 2 and the hand rod 5 are obtained by, for example, firing a prepreg sheet containing carbon fibers impregnated with a synthetic resin to form a tubular fired body, and polishing and coating the fired body. The manufacturing process of the tip rod 2 will be detailed later.

A grip 4 is provided at the rear end of the hand rod 5. A reel sheet 3 is provided in front of the grip 4 of the hand rod 5. A plurality of fishing line guides 7 are attached to the upper end of the outer peripheral surface of the tip rod 2 and the hand rod 5. A reel (not illustrated) is attached to the reel sheet 3. In the illustrated example, a double-bearing reel is attached to the reel sheet 3. The double-bearing reel is sometimes called "bait reel" or "bait casting reel". When a double-bearing reel is used, the fishing line guide 7 is provided at the upper end of the outer peripheral surfaces of the tip rod 2 and the hand rod 5 as illustrated. In another example, a spinning reel may be attached to the reel sheet 3. When the spinning reel is used, the fishing line guide 7 is provided at the lower end of the outer peripheral surfaces of the tip rod 2 and the hand rod 5. In this specification, when referring to the front-back directions of the fishing rod 1 or the tip rod 2 and the hand rod 5 constituting the fishing rod 1, the front-back direction shown in FIG. 1 is used as a reference.

The hand rod 5 may be configured such that its inner diameter is greater than that of the tip rod 2. The tip rod 2 is an example of a small-diameter rod body, and the hand rod 5 is an example of a large-diameter rod body. The hand rod 5 and the tip rod 2 are formed to have inner diameters of 3 mm to 15 mm, and outer diameters of 5 mm to 20 mm, for example. The dimensions of the tip rod 2 and the hand rod 5 described herein are exemplary.

As shown in FIG. 3, the tip rod 2 includes, in the vicinity of the rear end 2a1, a stress relieving layer 21, a main body protection layer 22 provided on the outer surface of the stress relieving layer 21, a main body layer 23 provided on the outer surface of the main body protection layer 22, and a reinforcement layer 24 provided on the outer surface of the main body layer 23. All of the stress relieving layer 21, the main body protection layer 22, the main body layer 23, and the reinforcement layer 24 are obtained by firing a fiber-reinforced resin sheet containing reinforced fiber bundles made of reinforced fibers impregnated with a matrix resin. The manufacturing process of the tip rod 2 will be detailed later.

In the vicinity of the rear end 2a1 of the tip rod 2, the stress relieving layer 21 is disposed on the radially innermost side. Therefore, in the vicinity of the rear end 2a1 of the tip rod 2, an inner peripheral surface 21A of the stress relieving layer 21 constitutes an inner peripheral surface 2b of the tip rod 2. The inner peripheral surface 21A of the stress relieving layer 21 has: an inclined surface 21A1 extending forward from the rear end 2a1 of the tip rod 2 with an inclination with respect to the direction of the central axis X; and a parallel surface 21A2 extending forward from the front end of the inclined surface 21A1 in parallel with a central axis A.

The tip rod 2 and the hand rod 5 are detachably connected to each other via a socket-and-spigot core member 6. The socket-and-spigot core member 6 is obtained by, for example, firing a prepreg sheet containing carbon fibers impregnated with a synthetic resin to form a tubular fired body, and polishing and coating the fired body. The socket-and-spigot core member 6 includes: a substantially cylindrical rear end 6a; an inclined portion 6b that is provided in front of the rear end 6a and whose outer peripheral surface is inclined at a first angle θ1 with respect to the central axis X; and a front end 6c that is provided in front of the inclined portion 6b and that is substantially cylindrical in shape. The front end 6c is formed to have a diameter smaller than that of the rear end 6a. The socket-and-spigot core member 6 is formed to have a central axial length of 50 mm to 150 mm, and an outer diameter of the rear end 6a of 3 mm to 15 mm. The first angle θ1 between the outer peripheral surface of the inclined portion 6b and the central axis X is, for example, 0.05° to 5.0°. The inclination of the outer peripheral surface of the inclined portion 6b shown in FIG. 2 is exaggerated to clearly indicate that it is inclined. The socket-and-spigot core member 6 may be hollow or solid. The dimensions and shapes of the socket-and-spigot core member 6 described herein are exemplary. For example, the socket-and-spigot core member 6 may also be configured to have an outer peripheral surface inclined at a constant angle from its rear end to its front end with respect to the central axis X.

The socket-and-spigot core member 6 may be inserted into the hand rod 5 up to a predetermined position in the direction of the central axis X, and is fixed to an inner peripheral surface 5b of the hand rod 5 by, for example, bonding. The socket-and-spigot core member 6 is fixed to the hand rod 5 so that part thereof protrudes forward from the front end 5a2 of the hand rod 5. The socket-and-spigot core member 6 protruding from the front end 5a2 of the hand rod 5 is inserted into the tip rod 2 from the rear end 2a1 up to the alignment position, whereby the tip rod 2 and the hand rod 5 are connected via the socket-and-spigot core member 6. The socket-and-spigot core member 6 is an example of a shaft member inserted into a rod body. In another example, the socket-and-spigot core member 6 is bonded to the inner peripheral surface 2b of a joint 2a of the tip rod 2. In this example, the socket-and-spigot core member 6 is fixed to the tip rod 2 to protrude backward from the rear end 2a1 of the tip rod 2. A portion of the socket-and-spigot core member 6 protruding from the rear end 2a1 of the tip rod 2 is inserted into the hand rod 5, whereby the tip rod 2 and the hand rod 5 are connected via the socket-and-spigot core member 6.

In FIG. 2, the socket-and-spigot core member 6 is inserted up to the alignment position. When the socket-and-spigot core member 6 reaches the alignment position, a gap is formed between the front end 5a2 of the hand rod 5 and the rear end 2a1 of the tip rod 2. The length of the gap in the direction of the central axis X is, for example, 3 mm to 10 mm. The dimensions of the gap are exemplary. Since there is a gap between the tip rod 2 and the hand rod 5, bending stress and shearing stress act on the socket-and-spigot core member 6 when the tip rod 2 and the hand rod 5 bend during the use of the fishing rod 1.

When the socket-and-spigot core member 6 is inserted up to the alignment position, an outer surface 6e of the socket-and-spigot core member 6 comes in contact with the inner peripheral surface of the stress relieving layer 21 at a position A1 on the boundary between the inclined surface 21A1 and the parallel surface 21A2 on the inner peripheral surface of the stress relieving layer 21. Therefore, the socket-and-spigot core member 6 is supported by the inner peripheral surface of the stress relieving layer 21 at the position A1. The position A1 is an example of a support position. When the socket-and-spigot core member 6 is inserted up to the alignment position, the outer diameter of the socket-and-spigot core member 6 and the inner diameter of the stress relieving layer 21 coincide or substantially coincide with each other at the position A1.

Next, the inner peripheral surface 21A of the stress relieving layer 21 will be further described with reference to FIG. 4. As mentioned above, the inner peripheral surface 21A has the inclined surface 21A1 and the parallel surface 21A2. The inclined surface 21A1 has an irregular structure. In the illustrated example, the inclined surface 21A1 has eight concave portions 21a1 to 21a8 and eight convex portions 21b1 to 21b8. The irregular structure is defined with reference to a virtual curve Y. Specifically, the concave portions 21a1 to 21a8 are concave from the virtual curve Y toward the opposite direction of the central axis X (radially outward), and the convex portions 21b1 to 21b8 are convex from the virtual curve Y toward the central axis X. The virtual curve Y is a virtual curve that is convex toward the central axis X through a support position A1 and a one end position A2 at the rear end of the inner peripheral surface 21A of the stress relieving layer 2 in an area the radially outer from the outer peripheral surface 6e of the socket-and-spigot core member 6. The convex portions 21b1 to 21b8 protrude toward the central axis X from the virtual curve Y to not interfere with the socket-and-spigot core member 6 when the tip rod 2 is not bent. In other words, when the tip rod 2 is not bent, the convex portions 21b1 to 21b8 are located radially outward from the outer surface 6e of the socket-and-spigot core member 6. The concave portions 21a1 to 21a8 and the convex portions 21b1 to 21b8 are located between the support position A1 and the one end position A2 in the axial direction.

As shown in FIG. 3, the one end position A2 is located radially outward from the support position A1. When cutting the tip rod 2 in a plane including the central axis X, a virtual line connecting the support position A1 and the one end position A2 is inclined at a second angle θ2 greater than the first angle θ1 with respect to the central axis X. The second angle θ2 is, for example, an angle greater than the first angle θ1. The second angle θ2 is, for example, 0.1° to 10.0°. In one example, the second angle θ2 is 2.0°.

Figure 5:
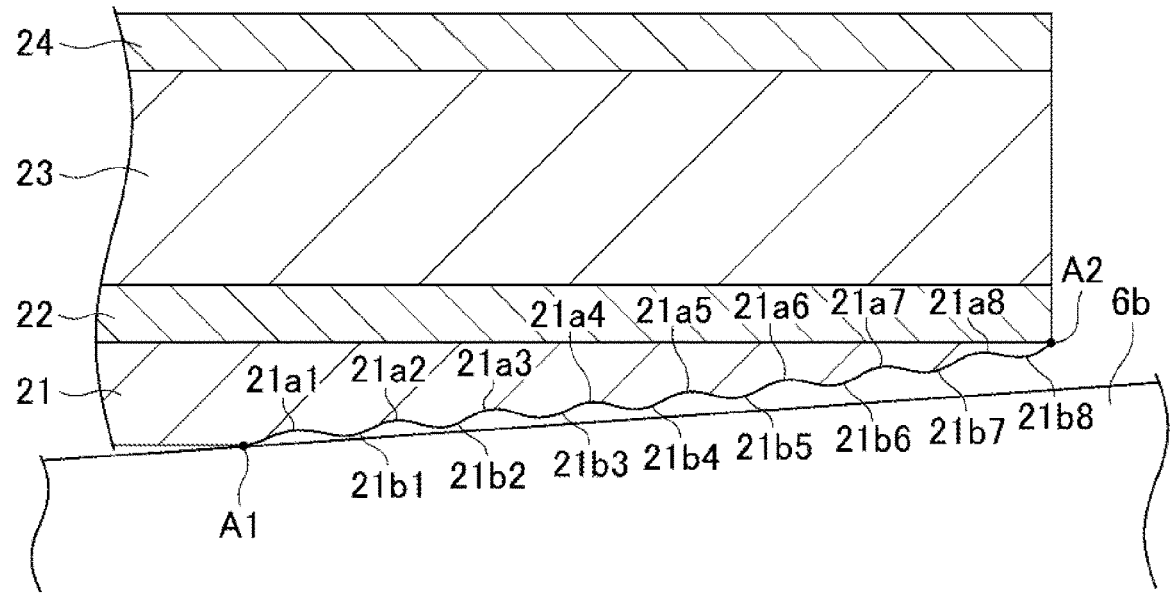
FIG. 5a shows a diagram schematically illustrating an arrangement of the outer peripheral surface of a shaft member with respect to the inner peripheral surface of a large-diameter rod body.
FIG. 5b shows a diagram schematically illustrating an arrangement of the outer peripheral surface of a shaft member with respect to the inner peripheral surface of a large-diameter rod body.
FIG. 5c shows a diagram schematically illustrating an arrangement of the outer peripheral surface of a shaft member with respect to the inner peripheral surface of a large-diameter rod body.
Figure 5:
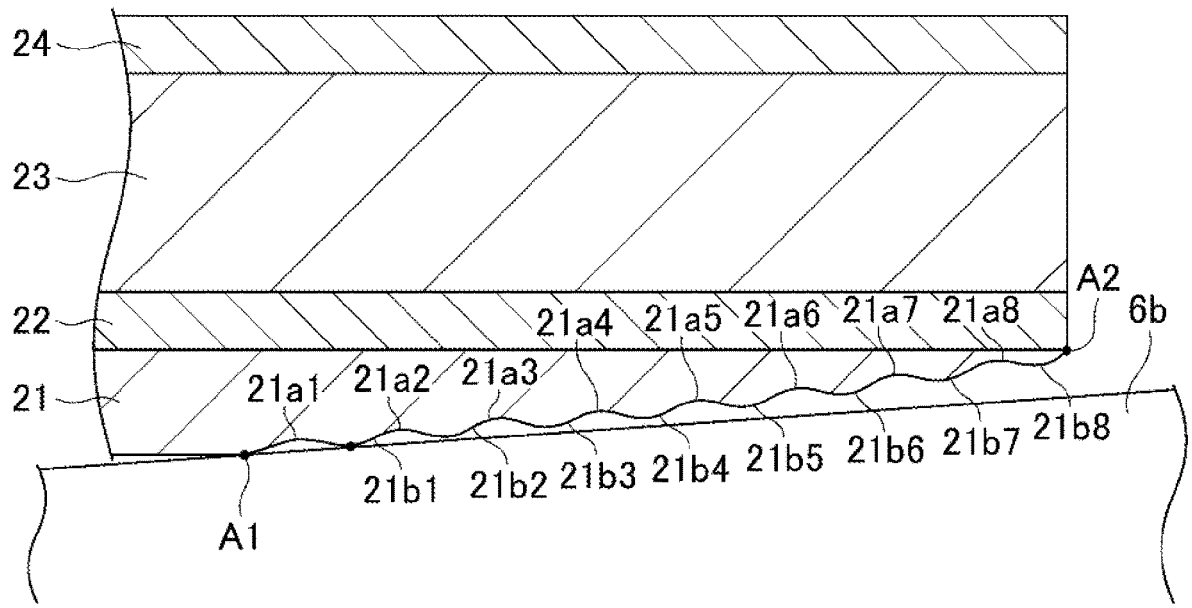
Figure 5:
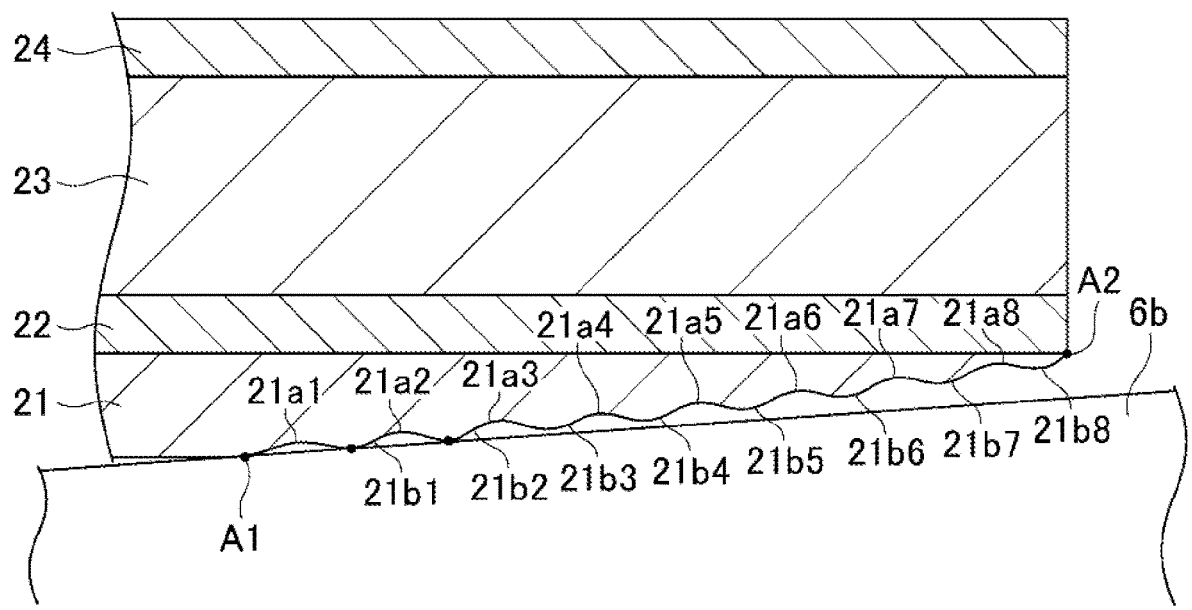

Next, the positional relation between the outer surface 6e of the socket-and-spigot core member 6 and the inner peripheral surface of the inner peripheral surface 2b of the tip rod 2 (the inner peripheral surface 21A of the stress relieving layer 21) when the fishing rod 1 is used will be described with reference to FIGS. 5a to 5c. As shown in FIG. 5a, when the tip rod 2 is not bent or slightly bent, the outer surface 6e of the socket-and-spigot core member 6 is supported by the inner peripheral surface 2b of the tip rod 2 at the support position A1, but is not in contact with the inner peripheral surface 2b of the tip rod 2 at any other positions. When the deflection of the tip rod 2 increases, a convex portion 21b1 located closest to the support position A1 among the convex portions 21b1 to 21b8 comes in contact with the outer surface 6e of the socket-and-spigot core member 6 as shown in FIG. 5b. When the deflection of the tip rod 2 increases, a convex portion 21b2, which is the second closest to the support position A1, of the convex portions 21b1 to 21b8 comes in contact with the outer surface 6e of the socket-and-spigot core member 6 as shown in FIG. 5c. As described above, as the deflection of the tip rod 2 increases, the convex portions 21b1 to 21b8 come in contact with the outer surface 6e of the socket-and-spigot core member 6 in the ascending order of distance from the support position A1. Depending on the shapes of the convex portions 21b1 to 21b8, two or more of the convex portions 21b1 to 21b8 may come in contact with the outer surface 6e of the socket-and-spigot core member 6 at the same time when the tip rod 2 bends.

As described above, the socket-and-spigot core member 6 may be bonded to the inner peripheral surface 2b of the joint 2a of the tip rod 2. In this instance, a portion of the socket-and-spigot core member 6 protruding from the rear end 2a1 of the tip rod 2 may be inserted into the hand rod 5 so that the tip rod 2 and the hand rod 5 may be connected via the socket-and-spigot core member 6. In this example, a portion in the vicinity of the distal end of the inner peripheral surface 5b of the hand rod 5 is formed in the same manner as a portion in the vicinity of the rear end of the inner peripheral surface 2b of the tip rod 2. Specifically, an inclined surface with an irregular structure corresponding to the inclined surface 21A1 is formed in the vicinity of the distal end of the inner peripheral surface 5b of the hand rod 5. The inclined surface 21A1 and an inclined surface with an irregular structure corresponding to the inclined surface 21A1 may be formed in the vicinity of the rear end of the inner peripheral surface of the tip rod 2, and in the vicinity of the front end of the inner peripheral surface of the hand rod 5, respectively. Breakage of the socket-and-spigot core member 6 may be further suppressed by providing the inclined surface with such an irregular structure on both the tip rod 2 and the hand rod 5. In this example, the socket-and-spigot core member 6 may be bonded to the inner peripheral surface of the hand rod 5 or to the inner peripheral surface of the tip rod 2.

Next, a method of manufacturing the tip rod 2 will be described with reference to FIG. 6. To manufacture the tip rod 2, first of all, a mandrel 50 and fiber-reinforced resin sheets 51, 52, 53 and 54 are prepared. The illustrated mandrel 50 has a tapered shape. When referring to the widths and lengths of the fiber-reinforced resin sheets 51, 52, 53, and 54, a description will be given with reference to a W direction (width direction) and a L direction (length direction) shown as orthogonal coordinates in FIG. 6. The central axis of the mandrel 50 extends in a direction parallel to the L direction.

The fiber-reinforced resin sheets 51, 52, 53 and 54 are sheet-like composite members containing reinforced fiber bundles made of reinforced fibers impregnated with a matrix resin. The reinforced fibers contained in the fiber-reinforced resin sheets 51, 52, 53 and 54 are, for example, carbon fibers or glass fibers. The matrix resin component contained in the fiber-reinforced resin sheets 51, 52, 53 and 54 is, for example, an epoxy resin-based resin, a bisphenol A-based resin, a bisphenol F-based resin, or a combination thereof. In the illustrated example, each of the fiber-reinforced resin sheets 51, 52, 53 and 54 is generally trapezoidal. The fiber reinforced resin sheets 51, 52, 53 and 54 are not always trapezoidal.

In one example, the tensile modulus of elasticity of the reinforced fibers contained in a fiber-reinforced resin sheet 51 is smaller than the tensile modulus of elasticity of the reinforced fibers contained in a fiber-reinforced resin sheet 53. In an example, the reinforced fibers contained in the fiber-reinforced resin sheet 51 have a tensile modulus of elasticity of not less than 1 t/mm², 1.5 t/mm², 2 t/mm², 3 t/mm², 4 t/mm², 5 t/mm², 6 t/mm², 7 t/mm², 8 t/mm², 9 t/mm² or 10 t/mm². In another example, the reinforced fibers contained in the fiber-reinforced resin sheet 53 have a tensile modulus of elasticity of 20 t/mm² to 30 t/mm², 22 t/mm² to 28 t/mm², or 23 t/mm² to 27 t/mm². The reinforced fibers contained in the fiber-reinforced resin sheet 51 may be aligned in the circumferential direction about the central axis X. In one example, the reinforced fibers contained in the fiber-reinforced resin sheet 51 are aligned in the axial direction along the central axis X. A fiber-reinforced resin sheet 54 may have knitted (e.g., plain woven) reinforced fibers. The orientation direction of the reinforced fibers contained in the fiber-reinforced resin sheets 51 to 54 is not limited to the directions described herein.

The fiber-reinforced resin sheets 51 and 52 have substantially the same widths and lengths. The fiber-reinforced resin sheets 51 and 52 have, for example, a width of only 1 ply wound around the mandrel 50. The fiber-reinforced resin sheet 53 has larger dimensions in the widthwise and longitudinal directions than the fiber-reinforced resin sheets 51 and 52. The fiber-reinforced resin sheet 53 has, for example, a width of only 3 plies wound around the mandrel 50. The fiber-reinforced resin sheet 54 has a larger dimension in the longitudinal direction than the fiber-reinforced resin sheets 51 and 52, and has a smaller dimension in the longitudinal direction than the fiber-reinforced resin sheet 53.

Figure 6:
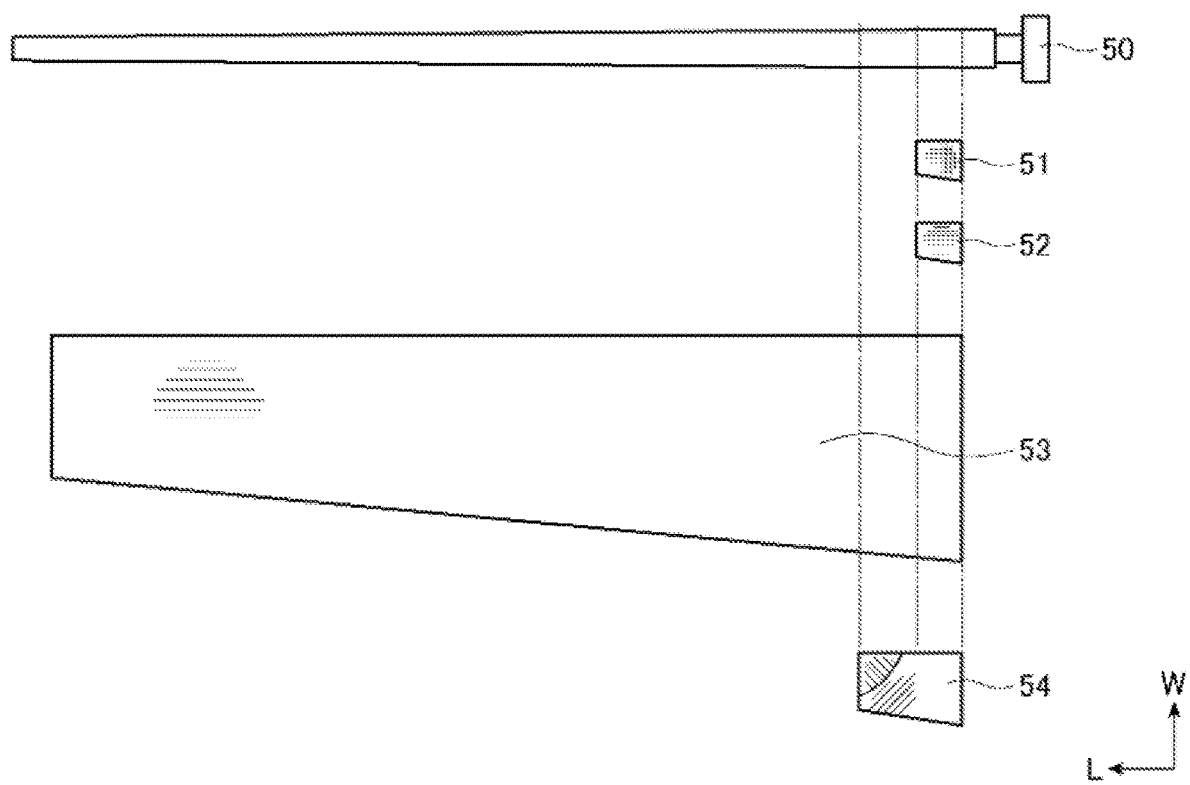
FIG. 6 shows a schematic diagram illustrating the method of manufacturing the fishing rod in FIG. 1.

As shown in FIG. 6, the fiber-reinforced resin sheet 51 is arranged with respect to the mandrel 50 so that one side thereof is parallel to the central axis of the mandrel 50, and wound around the outer peripheral surface of the mandrel 50 while maintaining the arrangement. The fiber-reinforced resin sheet 52 is arranged so that the right end thereof is aligned with the right end of the fiber-reinforced resin sheet 51, and wound around the outer peripheral surface of the fiber-reinforced resin sheet 51 while maintaining the arrangement. The fiber-reinforced resin sheet 53 is arranged so that the right end thereof is aligned with the right end of the fiber-reinforced resin sheet 52, and wound around the outer peripheral surface of the fiber-reinforced resin sheet 52 while maintaining the arrangement. The fiber-reinforced resin sheet 54 is arranged so that the right end thereof is aligned with the right end of the fiber-reinforced resin sheet 53, and wound around the outer peripheral surface of the fiber-reinforced resin sheet 53 while maintaining the arrangement.

A hollow tubular fired body is obtained by firing the fiber-reinforced resin sheets 51, 52, 53 and 54 wound on the mandrel 50 and removing the mandrel 50 thereafter. The fiber-reinforced resin sheets 51, 52, 53 and 54 are fired to form the stress relieving layer 21, the main body protection layer 22, the main body layer 23, and the reinforcement layer 24, respectively. The inner peripheral surface of the fired fiber-reinforced resin sheet 51 (stress relieving layer 21) is machined using a tool such as a tapered reamer that forms the inclined surface 21A1 on the inner peripheral surface 21A of the stress relieving layer 21. In one example, the inclined surface 21A1 is formed by inserting the tapered reamer into the tip rod 2 from its rear end 2a1 so that the axial direction thereof is slightly inclined with respect to the central axis X (e.g., inclined at an angle in a range of 0.05° to 2°) and machining the inner peripheral surface 21A of the stress relieving layer 21. When machining the stress relieving layer 21, a portion of the main body protection layer 22 provided on the outer peripheral surface of the stress relieving layer 21 may also be machined. However, it is desirable that the main body layer 23 provided on the outer peripheral surface of the main body protection layer 22 is not machined.

The tip rod 2 is obtained by polishing and coating the hollow tubular fired body described above as appropriate.

Figure 7:
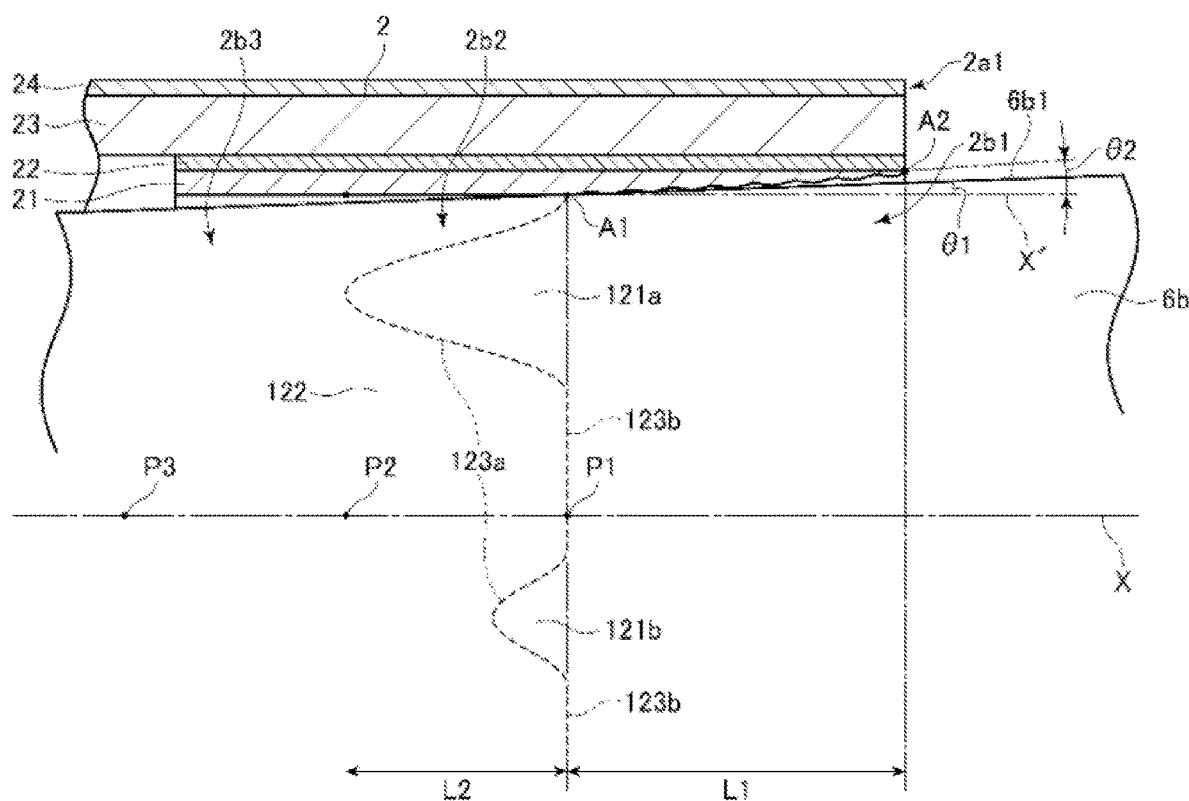
FIG. 7 shows a schematic diagram schematically illustrating an enlarged joint structure between a large-diameter rod body and a small-diameter rod body of a fishing rod according to another example.
Figure 8:
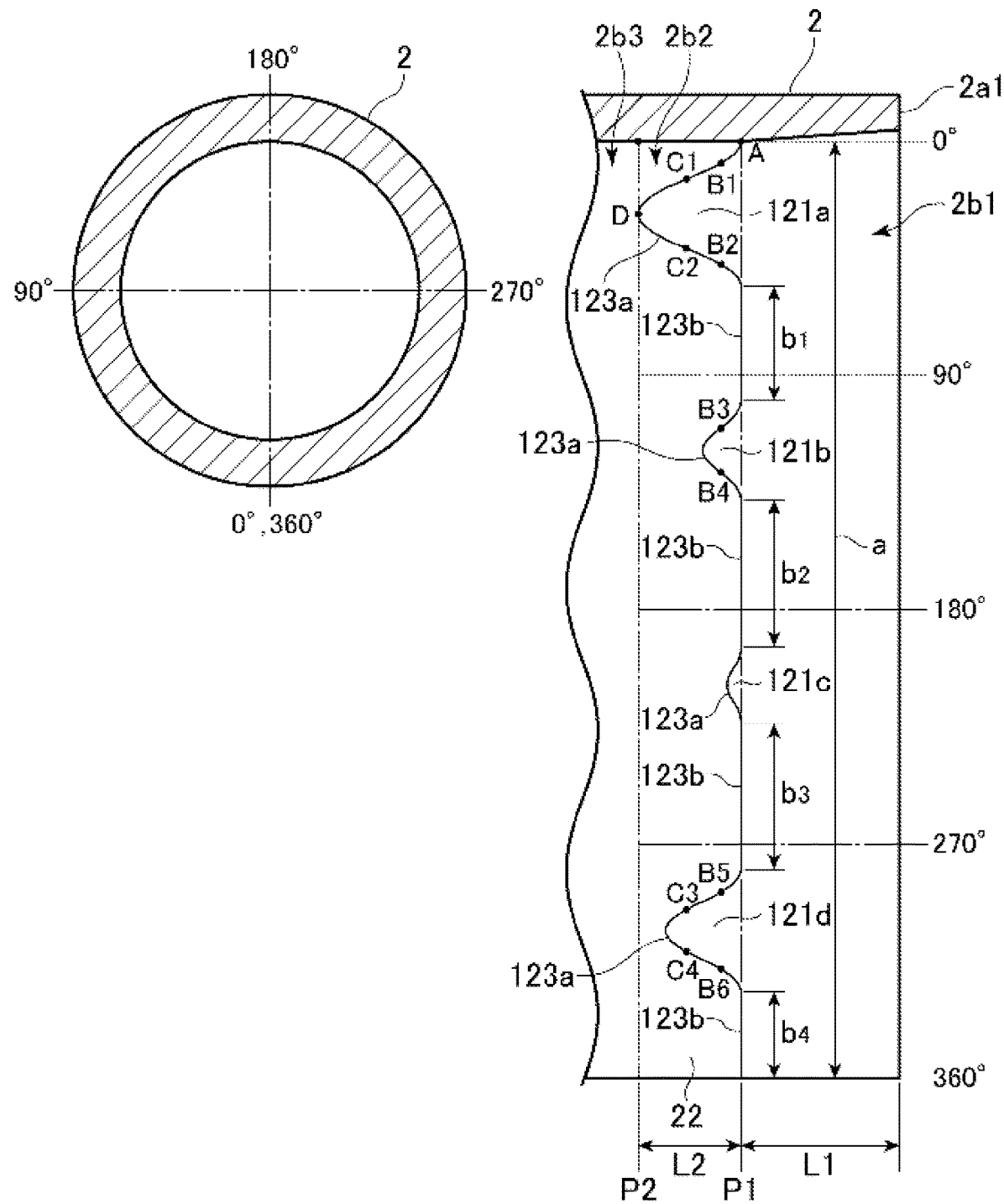
FIG. 8 shows a schematic diagram illustrating a joint structure of the fishing rod shown in FIG. 7 that is cut open along a line extending in the central axis direction.

Next, a fishing rod according to another example will be described with reference to FIGS. 7 to 8. FIG. 7 is a cross section diagram schematically illustrating a joint structure of a large-diameter rod body and a small-diameter rod body of a fishing rod, FIG. 8 is a schematic development diagram illustrating the joint structure of the fishing rod shown in FIG. 7 that is cut open along a line extending in the direction of the central axis X. In the example shown in FIGS. 7 and 8, the inner peripheral surface 2b of the tip rod 2 (the inner peripheral surface 21A of the stress relieving layer 21) is shaped differently from the example shown in FIGS. 1 to 4. Hereinafter, the shape of the inner peripheral surface 2b of the tip rod 2 in a fishing rod according to another example will be described with reference to FIGS. 7 and 8.

The inner peripheral surface 2b of the tip rod 2 has an inclined surface 2b1 extending forward from the rear end 2a1 with an inclination with respect to the direction of the central axis X, a stress relieving surface 2b2 extending from the position P1 of the front end of the inclined surface 2b1 to a position P2, and a cylindrical surface 2b3 extending from the position P2 to a position P3. The position P1 indicates a position moved by L1 forward along the central axis X from the rear end 2a1 of the tip rod 2, and the position P2 indicates a position moved by L2 forward along the central axis X from the position P1. The position P3 is any position on the central axis X between the position P2 and the front end 2a2 of the tip rod 2. A length L1 is, for example, 1 mm to 30 mm. In one example, the length L1 is 1 mm to 5 mm. A length L2 is equal to or less than the length L1. When the stress relieving surface 2b2 extending forward from the position P1 becomes longer (the length L2 starting from the position P1 increases), the ratio of the stress relieving surface 2b2 to the tip rod 2 increases. Since the stress relieving surface 2b2 is thinned, the strength around the rear end of the tip rod 2 may become insufficient with the increase of the length L2. Setting the length L2 to be equal to or less than the length L1 may prevent the tip rod 2 from becoming insufficient in strength.

The inclined surface 2b1 extends to P1 with an inclination at the second angle θ2 greater than the first angle θ1 with respect to the central axis X. In other words, a virtual line connecting the support position A1 and the one end position A2 is inclined at the second angle θ2 greater than the first angle θ1 with respect to the central axis X. The inclined surface 2b1, similarly to the inclined surface 21A1, has a plurality of irregularities.

The cylindrical surface 2b3 extends parallel or substantially parallel to the direction of the central axis X from the position P2 to the position P3. If the cylindrical surface 2b3 is inclined with respect to the direction of the central axis X at an angle smaller than the first angle θ1, the cylindrical surface 2b3 can be said to extend substantially parallel to the direction of the central axis X. The tip rod 2 may be configured to taper from the rear end toward the front end. In this example, the outer peripheral surface of the tip rod 2 extends with an inclination at a predetermined angle with the direction of the central axis X. The cylindrical surface 2b3 may extend parallel to the outer peripheral surface of the tip rod 2.

The stress relieving surface 2b2 is a portion between the inclined surface 2b1 and the cylindrical surface 2b3 of the inner peripheral surface 2b of the tip rod 2. The stress relieving surface 2b2 has inclined portions 121a, 121b, 121c and 121d, and a non-inclined portion 122. For convenience of description, the inclined portions 121a, 121b, 121c and 121d are sometimes collectively called an inclined portion 121. A boundary 123a between the inclined portion 121 and the non-inclined portion 122 has a waveform that is convex backward from a boundary 123b between the inclined surface 2b1 and the stress relieving surface 2b2. The boundary 123b extends in the circumferential direction around the central axis X. In this specification, the boundary 123a is sometimes called a stress relieving boundary, and collectively called a position boundary (or a support position boundary) together with the boundary 123b.

The inclined portion 121 is, at its rear end, continuous with the inclined surface 2b1. That is, the rear end of the inclined portion 121 is in the position P1. Each of the inclined portions 121 extends forward along the central axis X from the position P1. The front end of each of the inclined portions 121 may be different from each other. In the illustrated example, four inclined portions 121a, 121b, 121c and 121d are provided as described above, and the inclined portion 121a extends to the position P1 which is a boundary with the cylindrical surface 2b3. The inclined portion 121a extends most forwardly among the four inclined portions. The inclined portions 121b, 121c and 121d extend from the position P1 to a position between the position P1 and the position P2.

Each of the inclined portions 121, similarly to the inclined surface 2b1, is inclined at the second angle θ2 greater than the first angle θ1 with respect to the central axis X. The inclined portion 121 may have various angles with the direction of the central axis X depending on the position in the circumferential direction around the central axis X. For example, the angle between the inclined portion 121a and the direction of the central axis X may be different from the angle between the inclined portion 121b and the direction of the central axis X. Further, the angle between the inclined portion 121a and the direction of the central axis X at a position B2 in the circumferential direction may be different from the angle between the inclined portion 121a and the direction of the central axis X at the position B2 in the circumferential direction. That is, the angle between the inclined portion 121a and the direction of the central axis X may be different depending on the position in the circumferential direction. This also applies to the inclined portions 121b, 121c and 121d. The angle between the inclined portion 121 and the central axis may be the same as or different from the angle between the inclined surface 2b1 and the central axis.

Figure 9:
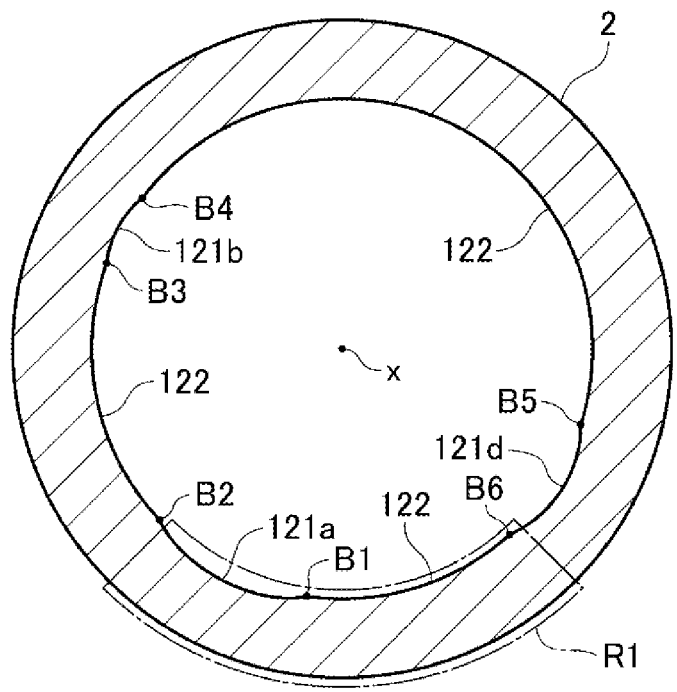
FIG. 9 shows a diagram schematically illustrating a cross section surface of a tip rod cut in a plane perpendicular to the central axis.
Figure 10:
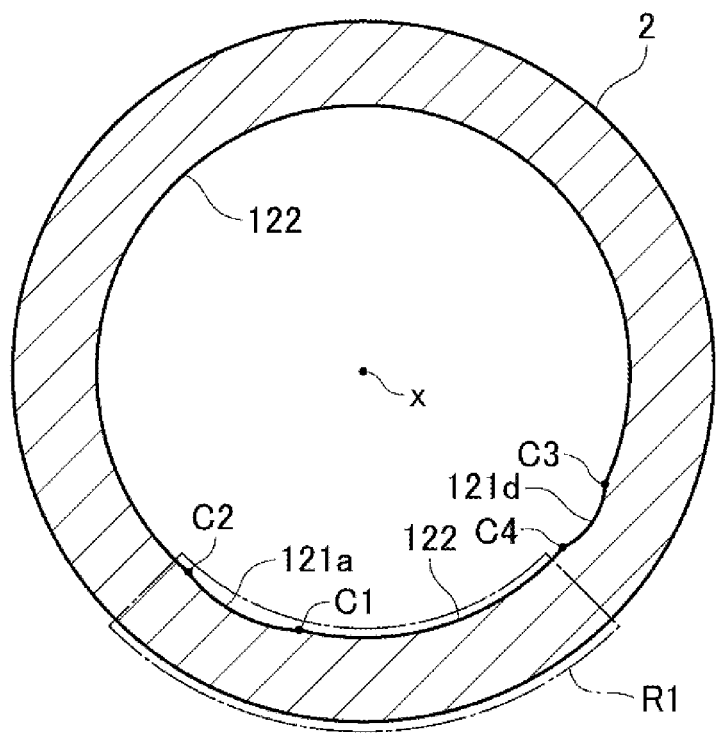
FIG. 10 shows a diagram schematically illustrating a cross section surface of a tip rod cut in a plane perpendicular to the central axis.

The stress relieving surface 2b2 will be further described also with reference to FIGS. 9 and 10. FIG. 9 is a diagram illustrating a cross section surface of the tip rod 2 cut in a plane perpendicular to the central axis X that passes through a position B1, and FIG. 10 is a diagram illustrating a cross section surface of the tip rod 2 cut in a plane perpendicular to the central axis X that passes through a position C1. In the direction along the central axis X, the position C1 is forward of the position B1.

As described above, the inclined portion 121a is inclined at an angle greater than the first angle θ1 with respect to the central axis X, while the non-inclined portion 122 extends parallel or substantially parallel to the central axis X. Accordingly, as shown in the cross section diagram in FIG. 9, a stress relieving surface 12b2 is concave radially outward from the tip rod 2 at the inclined portion 121a located between the position B1 and a position B2, between a position B3 and a position B4, and between a position B5 and a position B6, in the circumferential direction. Similarly, also in the cross section diagram shown in FIG. 6, the stress relieving surface 2b2 is concave radially outward from the tip rod 2 between the position C1 and a position C2 and between a position C3 and a position C4, in the circumferential direction.

Since the tip rod 2 bends downward as shown in FIG. 9 during the use of the fishing rod 1, the lower portion of the tip rod 2 is compressed. The portion of the tip rod 2 to be compressed is a portion within a predetermined angular range around the lower end of the tip rod 2. The lower end of the tip rod 2 indicates the position 0° in FIG. 8. In particular, a compressive force acts in an area of ±30° around the position 0°. The area within ±30° in the circumferential direction from the lower end of the tip rod 2 is called a compressed area R1.

In the illustrated example, since the fishing line guide 7 is provided at the upper end of the tip rod 2 (and the hand rod 5), the compressed area R1 is on the opposite side of the location of the fishing line guide 7 in the circumferential direction around the central axis X. To explain this with reference to FIG. 8, the fishing line guide 7 is provided at a position of 180° in the circumferential direction, and the compressed area R1 is at a position of ±30° around the position 0°. In another example in which a spinning reel is used, the fishing line guide 7 is provided at the position 0° in the circumferential direction so that the compressed area R1 is provided at the lower portion of the tip rod 2 as is the case for the fishing line guide 7.

At least one of the inclined portions 121a, 121b, 121c and 121d is provided in the compressed area R1. In the illustrated example, the inclined portion 121a is provided within the compressed area R1. The inclined portion 121a may be provided in whole or in part in the compressed area R1.

As described above, the stress relieving surface 2b2 has the non-inclined portion 122 and the inclined portion 121a that is concave in the radial direction of the tip rod 2 from the inclined portion 122. The shapes and arrangements of the inclined portion 121a on the stress relieving surface 2b2 are not limited to those illustrated.

In the illustrated example, a portion of the non-inclined portion 122 extends from the position P2 to the position P1. In other words, the rear end of a portion of the non-inclined portion 122 is located at the position P1 in the direction of the central axis X. The ratio of the circumferential length of the non-inclined portion 122 at the position P1 in the direction of the central axis X (corresponding to the length b1+b2+b3+b4 in FIG. 8) to the total circumferential length of the inner peripheral surface of the stress relieving surface 2b2 (corresponding to the length a in FIG. 8) is 0.5 or more. That is, (b1+b2+b3+b4)/a is 0.5 or more (50% or more on percentage).

As described above, to manufacture the tip rod 2 in one example, a tubular fired body is prepared by firing a prepreg sheet containing carbon fibers impregnated with a synthetic resin. The inclined surface 2b1 and the stress relieving surface 2b2 of the tip rod 2 are obtained by processing the inner peripheral surface of the tubular fired body using a tool such as, for example, a tapered reamer. In one example, the inclined surface 2b1 may first be formed by inserting a tapered reamer into the interior of the tip rod 2 so that its axial direction is slightly inclined with respect to the central axis X (e.g., inclined at an angle of 0.05° to 2°) and scraping the inner peripheral surface of the tip rod 2 and thereafter, the inclined portion 121a may be formed by scraping an area deeper than the inclined surface 2b1 of the inner peripheral surface of the tip rod 2 using a smaller-diameter reamer (e.g., a pin reamer). In another example, the inclined surface 2b1 and the inclined portion 121a may be formed by first scraping the inner peripheral surface of the tip rod 2 using a pin reamer to form a narrow groove corresponding to the inclined portion 121a, and then scraping the inner peripheral surface of the tip rod 2 more shallowly than the narrow groove using a tapered reamer. In this manner, the stress relieving surface 2b2 provided with the inclined surface 2b1 and the inclined portion 121a can be formed. The inclined surface 2b1 and the inclined portion 121a may be formed separately, or both may be formed at once.

As described above, the socket-and-spigot core member 6 may be bonded to the inner peripheral surface 2b of the joint 2a of the tip rod 2. In this example, the tip rod 2 and the hand rod 5 are connected via the socket-and-spigot core member 6 by inserting a portion of the socket-and-spigot core member 6 protruding from the rear end 2a1 of the tip rod 2 into the hand rod 5. In this instance, a portion in the vicinity of the distal end of the inner peripheral surface 5b of the hand rod 5 is formed in the same manner as a portion in the vicinity of the rear end of the inner peripheral surface 2b of the tip rod 2. Specifically, an irregular structure corresponding to the inclined surface 2b1 and the stress relieving surface 2b2 is formed in the vicinity of the distal end of the inner peripheral surface 5b of the hand rod 5.

The inclined surface 2b1 and the stress relieving surface 2b2 may be formed in the vicinity of the rear end of the inner peripheral surface of the tip rod 2, and an irregular structure corresponding to the inclined surface 2b1 and the stress relieving surface 2b2 may be formed in the vicinity of the front end of the inner peripheral surface of the hand rod 5. Providing such an irregular structure on both the tip rod 2 and the hand rod 5 can further suppress breakage. In this example, the socket-and-spigot core member 6 may be bonded to the inner peripheral surface of the hand rod 5 or the inner peripheral surface of the tip rod 2.

Figure 11:
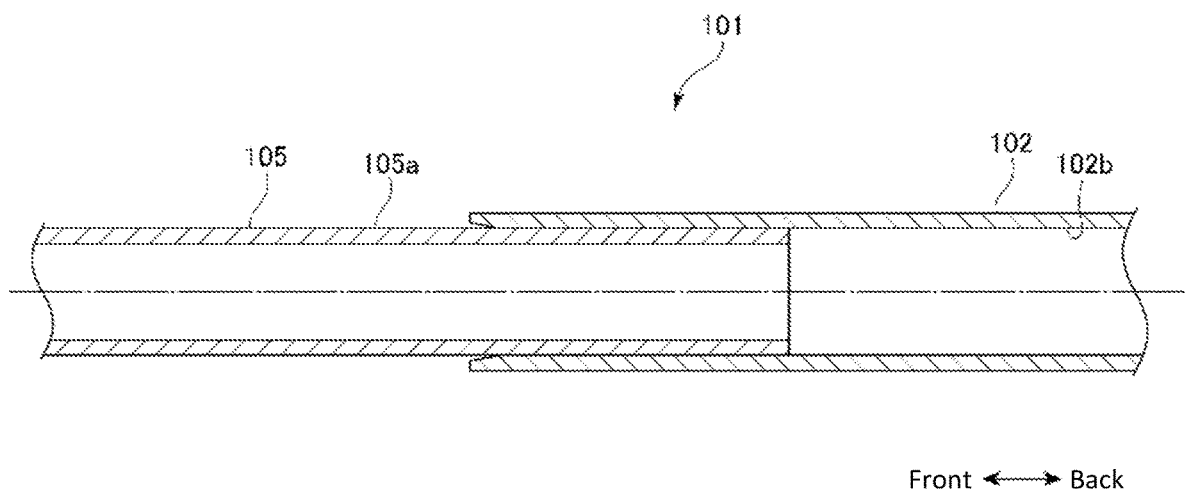
FIG. 11 shows a schematic diagram illustrating a fishing rod according to an example.

Next, a fishing rod 101 according to another example will be described with reference to FIG. 11. FIG. 11 is a cross section diagram schematically illustrating a joint structure in the fishing rod 101.

The fishing rod 101 is an ordinarily jointed type fishing rod. The fishing rod 101 has a hand rod 102 and a tip rod 105 joined to the tip of the hand rod 102. The tip rod 105 is configured to have a diameter smaller than that of the hand rod 102. Similarly to the tip rod 2, the hand rod 102 may include the stress relieving layer 21, the main body protection layer 22 provided on the outer surface of the stress relieving layer 21, the main body layer 23 provided on the outer surface of the main body protection layer 22, and the reinforcement layer 24 provided on the outer surface of the main body layer 23.

An outer peripheral surface 105a of the tip rod 105 comes in contact with the inner peripheral surface of the hand rod 102 at a support position located backward from the front end of the hand rod 102 when inserted into the hand rod 102 from its front end up to the alignment position. The outer diameter of the tip rod 105 and the inner diameter of the hand rod 102 coincide or substantially coincide with each other at said support position. The rear end of the tip rod 105 (the end on the side closer to the hand rod 102) corresponds to a shaft member to be inserted into the rod body.

An inner peripheral surface 102b of the hand rod 102 is configured in the same manner as the inner peripheral surface 2b of the tip rod 2 shown in FIGS. 3 and 4 (the inner peripheral surface 21A of the stress relieving layer 21). That is, the inner peripheral surface 102b of the hand rod 102, similarly to the inner peripheral surface 21A of the stress relieving layer 21, has an inclined surface corresponding to the inclined surface 21A1 with an irregular structure, and a parallel surface extending parallel to the central axis X from the inclined surface. The irregular structure of the inner peripheral surface 102b of the hand rod 102 may include, for example, a plurality of concave portions (for example, eight concave portions 21a1 to 21a8) and a plurality of convex portions (for example, eight convex portions 21b1 to 21b8) similarly to the irregular structure of the inclined surface 21A1 shown in FIG. 4. Though not illustrated, the outer peripheral surface 105a of the tip rod 105 is provided with an inclined portion similar to the inclined portion 6b of the socket-and-spigot core member 6.

In FIG. 11, only two rods of the hand rod 102 and the tip rod 105 are illustrated, but three or more rod bodies joined to one another may be used for an ordinarily jointed type fishing rod. Each of the rod bodies constituting the ordinarily jointed type fishing rod can be joined with a joint structure similar to that of the hand rod 102 and the tip rod 105.

Next, the effect of the above example will be described. The fishing rod 1 in one example described above includes the hollow tip rod 2, and the socket-and-spigot core member 6 supported at the support position A1 by the inner peripheral surface 2b of the tip rod 2 (the inner peripheral surface 21A of the stress relieving layer 21). The inner peripheral surface 2b (the inner peripheral surface 21A of the stress relieving layer 21) of the tip rod 2 has convex portions 21b1 to 21b8 protruding from the virtual curve Y toward the center axis X between the support position A1 and the one end position A2 in the axial direction. Therefore, as described with reference to FIGS. 5a to 5c, when the tip rod 2 bends, the convex portions 21b1 to 21b8 come in contact with the outer surface 6e of the socket-and-spigot core member 6. As a result, when the tip rod 2 bends, the socket-and-spigot core member 6 is supported not only by the inner peripheral surface 21A of the stress relieving layer 21 only at a single point of the axial support position A1, but also by at least part of the convex portions 21b1 to 21b8. This makes it possible to spread the stress acting on the socket-and-spigot core member 6 from the inner peripheral surface 2b of the tip rod 2 in a range with an expanse in the direction of the central axis X instead of concentrating the same on a single point in the direction of the central axis X (the support position A1), which enables the breakage of the socket-and-spigot core member 6 to be suppressed.

In one example described above, the tip rod 2 has the stress relieving layer 21 containing reinforced fibers in its innermost layer, and the main body layer 23 containing reinforced fibers radially outward from the stress relieving layer 21. Since the tensile modulus of elasticity of the reinforced fibers contained in the stress relieving layer 21 is smaller than that of the reinforced fibers contained in the main body layer 23, even if the stress relieving layer 21 is machined to form the inclined surface 21A, the resulting influence on the bending profile of the tip rod 2 in the axial direction is small. In other words, an inclined surface may be formed on the inner peripheral surface of the tip rod 2 by providing the stress relieving layer 21 without greatly affecting the bending profile of the tip rod 2.

When the tip rod 2 in the example is not bent, the convex portions 21b1 to 21b8 are located radially outward from the outer surface 6e of the socket-and-spigot core member 6. This makes it possible to insert the socket-and-spigot core member 6 into the tip rod 2 up to a predetermined alignment position without causing interference with the inner peripheral surface of the tip rod 2.

The inner peripheral surface 2b of the tip rod 2 in the example into which the socket-and-spigot core member 6 is inserted has, in the vicinity of its rear end, the inclined surface 2b1, the stress relieving surface 2b2, and the cylindrical surface 2b3. The stress relieving surface 2b2 has inclined portions 121a, 121b, 121c and 121d, and the non-inclined portion 122. The inclined surfaces 121 and the inclined portions 121a, 121b, 121c and 121d extend at an inclination angle greater than that of the outer peripheral surface of the socket-and-spigot core member 6 with respect to the direction of the central axis X, while the non-inclined portion 122 extends parallel or substantially parallel to the direction of the central axis X. When the socket-and-spigot core member 6 is fitted to the inner peripheral surface 2b of the tip rod 2, the inner peripheral surface 2b of the tip rod 2 comes in contact with the socket-and-spigot core member 6 on the alignment position boundary 123b. In this manner, the tip rod 2 is supported by the socket-and-spigot core member 6 on the boundary 123b. When the tip rod 2 and the hand rod 5 bend during the use of the fishing rod 1, the inner peripheral surface 2b of the tip rod 2 comes in contact with the socket-and-spigot core member 6 not only on the alignment position boundary 123b but also on the stress relieving boundary 123a.

Since the stress relieving boundary 123b has a waveform that is convex toward the rear end side in the direction of the central axis X, stress acting on the socket-and-spigot core member 6 from the inner peripheral surface 2b of the tip rod 2 acts not only at the position P1 in the direction of the central axis X in which the alignment position boundary 123b is located, but also at a position shifted backward in the direction of the central axis X from the position P1. That is, it is possible to spread the stress acting on the socket-and-spigot core member 6 from the inner peripheral surface 2b of the tip rod 2 in a range with an expanse in the direction of the central axis X instead of concentrating the same on a single point in the direction of the central axis X (position of P1). For example, FIG. 8 shows positions A, B1, C1 and D that exist on the stress relieving boundary 123a, and that are arranged at different positions in the direction of the central axis X. Before the tip rod 2 bends, the inner peripheral surface 2b of the tip rod 2 is in contact with the socket-and-spigot core member 6 on the alignment position boundary 123b. When the tip rod 2 and the hand rod 5 bend, the stress relieving boundary 123b comes in contact with the socket-and-spigot core member 6 in the ascending order of distance from the alignment position boundary 123b.

In the absence of a configuration corresponding to the stress relieving surface 2b2 in the conventional joint structure, stress on the socket-and-spigot core member concentrates on a single point in the axial direction at the rear end of the tip rod 2, which causes breakage of the socket-and-spigot core member. On the other hand, in the example described above, the stress on the socket-and-spigot core member 6 spreads in the direction of the central axis X because of the stress relieving surface 2b2 so that breakage of the socket-and-spigot core member can be suppressed.

Similarly in the joint structure of the ordinarily jointed type fishing rod 101 shown in FIG. 11, stress acting from the inner peripheral surface of the hand rod 102 on the tip rod 105 can be spread in the central axis direction. This can suppress breakage of the tip rod 105.

In one example described above, the ratio of the circumferential length of the non-inclined portion 122 at the position P1 in the direction of the central axis X to the total circumferential length of the inner peripheral surface of the stress relieving surface 2b2 is 0.5 or more. This makes it possible to reliably hold the socket-and-spigot core member 6 or the tip rod 105 at the position P1 (the support position A1) which is an alignment position while spreading the stress on the socket-and-spigot core member 6 or the tip rod 105 in the central axis direction.

The effect referred to above is particularly exerted by the inclined portions 121a, 121b, 121c and 121d that exist in the compressed area R1. The inclined portions 121a, 121b, 121c and 121d outside the compressed area R1 may be omitted.

Figure 12:
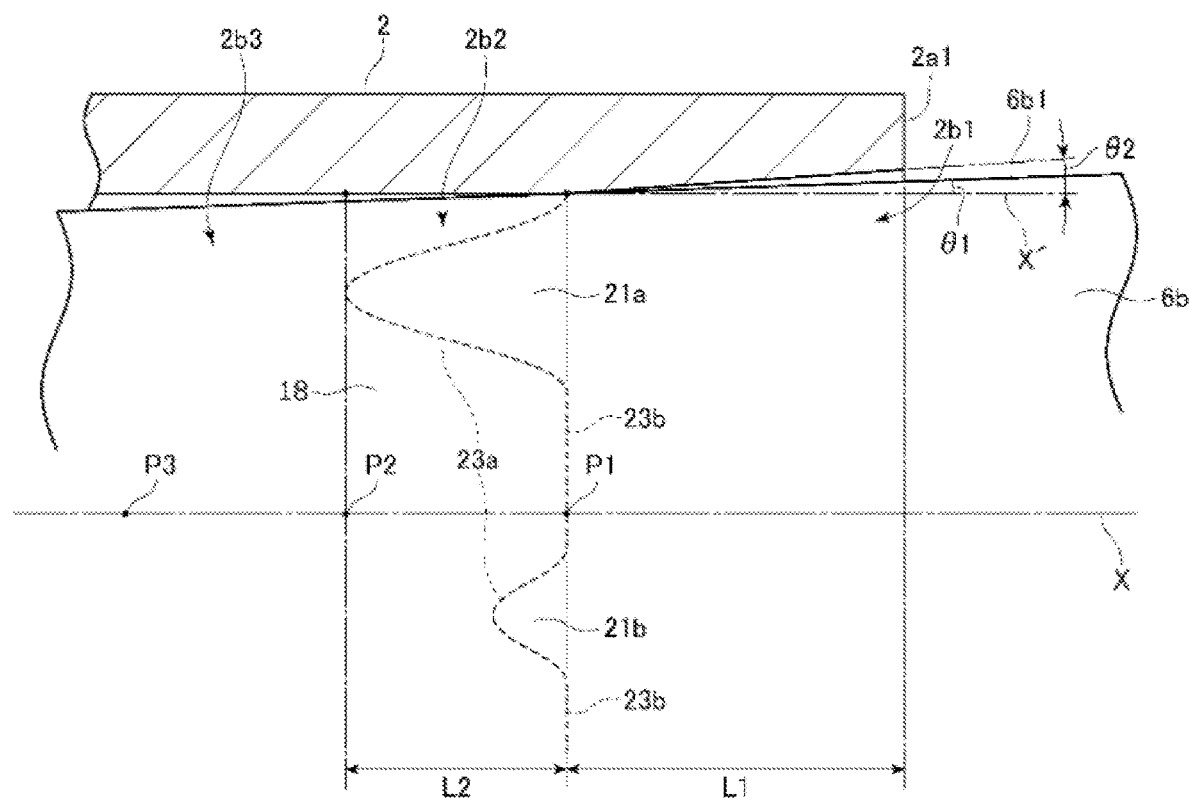
FIG. 12 shows a schematic diagram illustrating another mode of the enlarged joint structure shown in FIG. 2.

The fishing rod 1 according to an example will be described with reference to FIGS. 1, 2, 12 and 13. FIG. 1 is a schematic diagram of the socket-and-spigot jointed type fishing rod 1. FIG. 2 is a cross section diagram schematically illustration a joint structure of a large-diameter rod body and a small-diameter rod body in the fishing rod 1, FIG. 12 is a schematic diagram illustrating another mode of the enlarged joint structure shown in FIG. 2, and FIG. 4 is a schematic diagram illustrating another mode of the joint structure of the fishing rod 1 shown in FIG. 3 that is cut open along a line extending in the direction of the central axis X.

As illustrated, the fishing rod 1 has the tip rod 2 and the hand rod 5 joined to the tip rod 2. Both the tip rod 2 and the hand rod 5 are formed in a hollow tubular shape extending along the direction of the central axis X. The tip rod 2 extends from its rear end 2a1 to its front end 2a2. The hand rod 5 extends from its rear end Sal to its front end 5a2. The tip rod 2 and the hand rod 5 are obtained by, for example, firing a prepreg sheet containing carbon fibers impregnated with a synthetic resin to form a tubular fired body, and polishing and coating the fired body.

The grip 4 is provided at the rear end of the hand rod 5. The reel sheet 3 is provided in front of the grip 4 of the hand rod 5. A plurality of fishing line guides 7 are attached to the upper ends of the outer peripheral surfaces of the tip rod 2 and the hand rod 5. A reel (not illustrated) is attached to the reel sheet 3. In the illustrated example, a double bearing reel is attached to the reel sheet 3. The double bearing reel is sometimes called a bait reel or a bait casting reel. When a double bearing reel is used, the fishing line guide 7 is provided at the upper ends of the outer peripheral surfaces of the tip rod 2 and the hand rod 5 as illustrated. In another example, a spinning reel may be attached to the reel sheet 3. When a spinning reel is used, the fishing line guide 7 is provided at the lower ends of the outer peripheral surfaces of the tip rod 2 and the hand rod 5. In this specification, when referring to the front-back directions of the fishing rod 1 or the tip rod 2 and the hand rod 5 constituting the fishing rod 1, the front-back direction shown in FIG. 1 is used as a reference.

In one example, the hand rod 5 is configured to have an inner diameter greater than that of the tip rod 2. The tip rod 2 is an example of a small-diameter rod body, and the hand rod 5 is an example of a large-diameter rod body. Each of the inner diameters of the hand rod 5 and the tip rod 2 are, for example, 3 mm to 15 mm, and each of the outer diameters is 5 mm to 20 mm, respectively. The dimensions of the tip rod 2 and the hand rod 5 described herein are exemplary.

The tip rod 2 and the hand rod 5 are detachably connected to each other via the socket-and-spigot core member 6. The socket-and-spigot core member 6 can be obtained by, for example, firing a prepreg sheet containing carbon fibers impregnated with a synthetic resin to form a tubular fired body, and polishing and coating the fired body. The socket-and-spigot core member 6 includes: the substantially cylindrical rear end 6a, the inclined portion 6b that is provided in front of the rear end 6a and whose outer peripheral surface is inclined at the first angle $\theta 1$ with respect to the central axis X; and the substantially cylindrical front end 6c provided in front of the inclined portion 6b. The front end 6c is formed to have a diameter smaller than that of the rear end 6a. The socket-and-spigot core member 6 is formed to have a central axial length of 50 mm to 150 mm, and an outer diameter of the rear end 6a of 3 mm to 15 mm. The first angle $\theta 1$ between the outer peripheral surface of the inclined portion 6b and the central axis X is, for example, 0.05° to 5.0°. The inclination of the outer peripheral surface of the inclined portion 6b shown in FIG. 2 is exaggerated to clearly indicate that it is inclined. The socket-and-spigot core member 6 may be hollow or solid. The dimensions and shapes of the socket-and-spigot core member 6 described herein are exemplary. For example, the socket-and-spigot core member 6 may also be configured to have an outer peripheral surface inclined at a constant angle from its rear end to its front end with respect to the central axis X.

The socket-and-spigot core member 6 may be inserted into the hand rod 5 up to a predetermined position in the direction of the central axis X, and is fixed to the inner peripheral surface 5b of the hand rod 5 by, for example, bonding. The socket-and-spigot core member 6 may be fixed to the hand rod 5 so that part thereof protrudes forward from the front end 5a2 of the hand rod 5. The hand rod 5 may be in contact with the socket-and-spigot core member 6 in the vicinity of the front end thereof. The socket-and-spigot core member 6 is an example of a shaft member inserted into a rod body.

When the socket-and-spigot core member 6 protruding from the front end 5a2 of the hand rod 5 is inserted into the tip rod 2 from the rear end 2a1, the socket-and-spigot core member 6 is inserted into the tip rod 2 up to a predetermined alignment position. Thus, the tip rod 2 and the hand rod 5 are joined via the socket-and-spigot core member 6.

In FIG. 2, the socket-and-spigot core member 6 is inserted up to the alignment position. When the socket-and-spigot core member 6 reaches the alignment position, a gap is formed between the front end 5a2 of the hand rod 5 and the rear end 2a1 of the tip rod 2. The length of the gap in the direction of the central axis X is, for example, 3 mm to 10 mm. The dimensions of this gap are exemplary. Since there is a gap between the tip rod 2 and the hand rod 5, bending stress and shearing stress act on the socket-and-spigot core member 6 when the tip rod 2 and the hand rod 5 bend during the use of the fishing rod 1.

In another example, the socket-and-spigot core member 6 is bonded to the inner peripheral surface 2b of the joint 2a of the tip rod 2. In this instance, the socket-and-spigot core member 6 is fixed to the tip rod 2 to protrude backward from the rear end 2a1 of the tip rod 2. A portion of the socket-and-spigot core member 6 protruding from the rear end 2a1 of the tip rod 2 is inserted into the hand rod 5, whereby the tip rod 2 and the hand rod 5 are connected via the socket-and-spigot core member 6.

Next, the shape of the inner peripheral surface 2b in the vicinity of the rear end 2a1 of the tip rod 2 will be described. The inner peripheral surface 2b of the tip rod 2 has: the inclined surface 2b1 extending forward from the rear end 2a1 with an inclination with respect to the direction of the central axis X; a stress relieving surface 2b2 extending from the position P1 of the front end of the inclined surface 2b1 to the position P2; and the cylindrical surface 2b3 extending from the position P2 to the position P3. The position P1 indicates a position moved by L1 forward along the central axis X from the rear end 2a1 of the tip rod 2, the position P2 indicates a position moved by L2 forward along the central axis X from the position P1. The position P3 is any position on the central axis X between the position P2 and the front end 2a2 of the tip rod 2. The length L1 is, for example, 1 mm to 30 mm. In one example, the length L1 is 1 mm to 5 mm. The length L2 is equal to or less than the length L1. When the stress relieving surface 2b2 extending forward from the position P1 becomes longer (the length L2 starting from the position P1 increases), the ratio of the stress relieving surface 2b2 to the tip rod 2 increases. Since the stress relieving surface 2b2 is thinned, the strength around the rear end of the tip rod 2 may become insufficient with the increase of the length L2. Setting the length L2 to be equal to or less than the length L1 may prevent the tip rod 2 from becoming insufficient in strength. The positions P1, P2 and P3 are examples of the first, the second and the third positions in the direction of the central axis X, respectively.

The inclined surface 2b1 extends to P1 with an inclination at the second angle $\theta 2$ greater than the first angle $\theta 1$ with respect to the central axis X. The second angle $\theta 2$ is, for example, an angle greater than the first angle $\theta 1$. The second angle $\theta 2$ is, for example, 0.1° to 10.0°. In one example, the second angle $\theta 2$ is 2.0°. The inclined surface 2b1 may be inclined at the same angle at any position in the circumferential direction around the central axis X, or at a different angle depending on the position in the circumferential direction. For example, the second angle $\theta 2_1$ at the circumferential first position may be different from the second angle $\theta 2_2$ at the second position rotated by a predetermined angle from the first position in the circumferential direction. However, both the second angle $\theta 2_1$ and the second angle $\theta 2_2$ are greater than the first angle $\theta 1$.

The cylindrical surface 2b3 extends parallel or substantially parallel to the direction of the central axis X from the position P2 to the position P3. If the cylindrical surface 2b3 is inclined with respect to the direction of the central axis X at an angle smaller than the first angle $\theta 1$, the cylindrical surface 2b3 can be said to extend substantially parallel to the direction of the central axis X. The tip rod 2 may be configured to taper from the rear end toward the front end. In this example, the outer peripheral surface of the tip rod 2 extends with an inclination at a predetermined angle with the direction of the central axis X. The cylindrical surface 2b3 may extend parallel to the outer peripheral surface of the tip rod 2.

The stress relieving surface 2b2 is a portion between the inclined surface 2b1 and the cylindrical surface 2b3 of the inner peripheral surface 2b of the tip rod 2. The stress relieving surface 2b2 has inclined portions 21a, 21b, 21c and 21d, and a non-inclined portion 22. For convenience of description, the inclined portions 21a, 21b, 21c and 21d are sometimes collectively called an inclined portion 21. A boundary 23a between the inclined portion 21 and a non-inclined portion 18 has a waveform that is convex backward from a boundary 23b between the inclined surface 2b1 and the stress relieving surface 2b2. The boundary 23b extends in the circumferential direction around the central axis X. In this specification, the boundary 23a is sometimes called a stress relieving boundary, and collectively called a position boundary together with the boundary 23b.

The inclined portion 21 is, at its rear end, continuous with the inclined surface 2b1. That is, the rear end of the inclined portion 21 is at the position P1. Each of the inclined portions 21 extends forward along the central axis X from the position P1. The front ends of the inclined portions 21 may be different from each other. In the illustrated example, four inclined portions 21a, 21b, 21c and 21d are provided as described above, of which the inclined portion 21a extends to the position P1 that is a boundary with the cylindrical surface 2b3. The inclined portion 21a extends most forwardly among the four inclined portions. The inclined portions 21b, 21c and 21d extend from the position P1 to a position between the position P1 and the position P2.

Each of the inclined portions 21 is inclined at the second angle θ2 greater than the first angle θ1 with respect to the central axis X similarly to the inclined surface 2b1. The inclined portions 21 may be inclined at different angles with the central axis X depending on the position in the circumferential direction around the central axis X. For example, the angle between the inclined portion 21a and the direction of the central axis X may be different from the angle between the inclined portion 21b and the direction of the central axis X. Further, the angle between the inclined portion 21a and the direction of the central axis X at the circumferential position B1 may be different from the angle between the inclined portion 21a and the direction of the central axis X at the circumferential position B2. That is, the angle between the inclined portion 21a and the direction of the central axis X may vary depending on the circumferential position. This also applies to the inclined portions 21b, 21c and 21d. The angle between the inclined portion 21 and the central axis may be the same as or different from the angle between the inclined surface 2b1 and the central axis.

Figure 14:
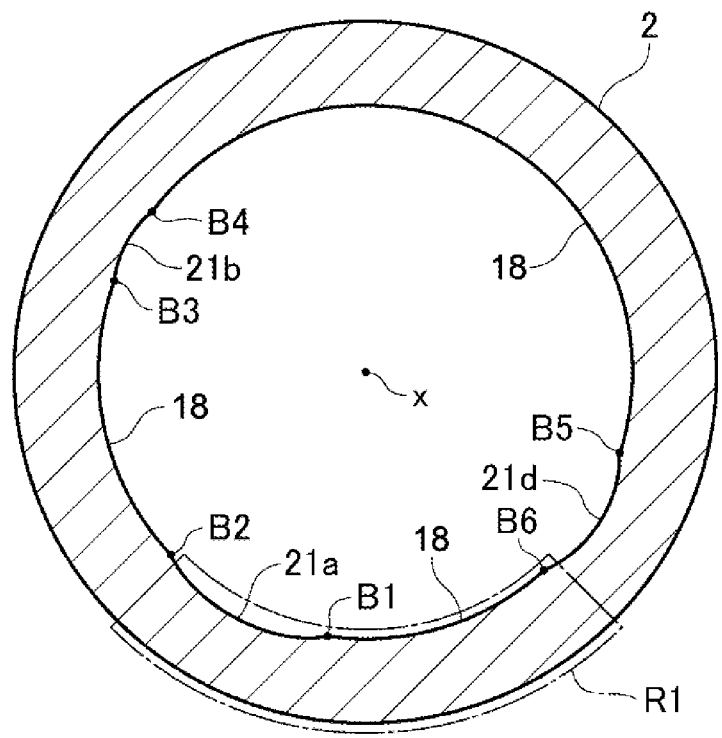
FIG. 14 shows a diagram schematically illustrating a cross section surface of a tip rod cut in a plane perpendicular to the central axis.
Figure 15:
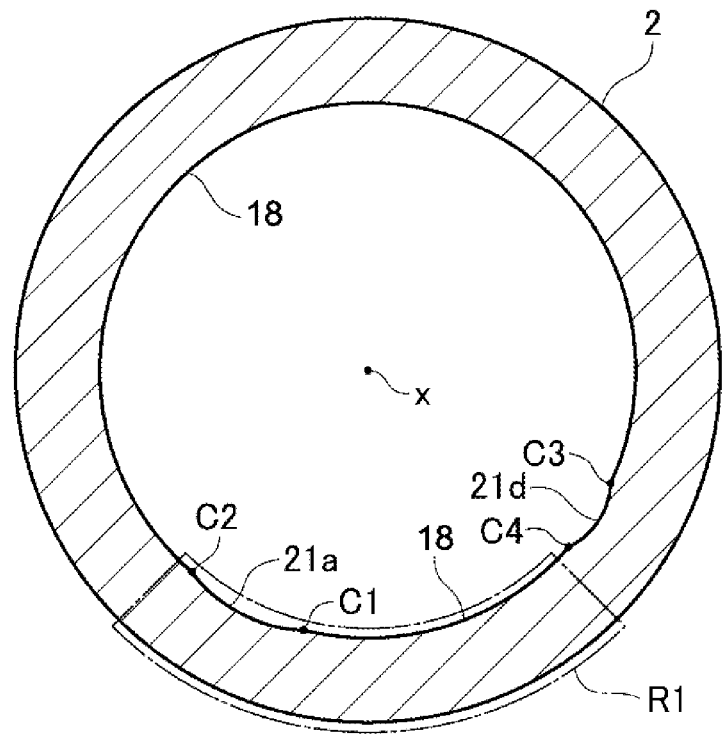
FIG. 15 shows a diagram schematically illustrating a cross section surface of a tip rod cut in a plane perpendicular to the central axis.

The stress relieving surface 2b2 will be further described with reference also to FIGS. 14 and 15. FIG. 14 is a diagram illustrating a cross section surface of the tip rod 2 cut in a plane perpendicular to the central axis X that passes through the position B1, and FIG. 15 is a diagram illustrating a cross section surface of the tip rod 2 cut in a plane perpendicular to the central axis X that passes through the position C1. In the direction along the central axis X, the position C1 is located forward from the position B1.

As described above, the inclined portion 21a is inclined at an angle greater than the first angle θ1 with respect to the central axis X while the non-inclined portion 18 extends parallel or substantially parallel to the central axis X. Therefore, as illustrated in the cross section diagram in FIG. 14, the stress relieving surface 2b2 is concave radially outward from the tip rod 2 at the inclined portion 21a located between the position B1 and the position B2, between the position B3 and the position B4, and between the position B5 and the position B6, in the circumferential direction. Similarly, also as illustrated in the cross section diagram in FIG. 15, the stress relieving surface 2b2 is concave radially outward from the tip rod 2 between the position C1 and the position C2 and between the position C3 and the position C4, in the circumferential direction.

Since the tip rod 2 bends downward as shown in FIG. 14 during the use of the fishing rod 1, the lower portion of the tip rod 2 is compressed. The portion of the tip rod 2 to be compressed is a portion within a predetermined angular range around the lower end of the tip rod 2. The lower end of the tip rod 2 indicates the position 0° in FIG. 13. In particular, a compressive force acts in an area of ±30° around the position 0°. The area within ±30° in the circumferential direction from the lower end of the tip rod 2 is called the compressed area R1.

In the illustrated example, since the fishing line guide 7 is provided at the upper end of the tip rod 2 (and the hand rod 5), the compressed area R1 is on the opposite side of the location of the fishing line guide 7 in the circumferential direction around the central axis X. To explain this with reference to FIG. 13, the fishing line guide 7 is provided at a position of 180° in the circumferential direction, and the compressed area R1 is at a position of ±30° about the position 0°. In another example in which a spinning reel is used, the fishing line guide 7 is provided at the position 0° in the circumferential direction, so that the compressed area R1 is provided at the lower portion of the tip rod 2 as is the case for the fishing line guide 7.

At least one of the inclined portions 21a, 21b, 21c and 21d is provided in the compressed area R1. In the illustrated example, the inclined portion 21a is provided in the compressed area R1. The inclined portion 21a may be provided in whole or in part in the compressed area R1.

Thus, the stress relieving surface 2b2 has the non-inclined portion 18, and the inclined portion 21a that is concave in the radial direction of the tip rod 2 from the inclined portion 22. The shapes and arrangements of the inclined portion 21a on the stress relieving surface 2b2 are not limited to those illustrated.

In the illustrated example, a portion of the non-inclined portion 18 extends from the position P2 to the position P1. In other words, the rear end of a portion of the non-inclined portion 18 is located at the position P1 in the direction of the central axis X. The ratio of the circumferential length (corresponding to the length b1+b2+b3+b4 in FIG. 13) of the non-inclined portion 18 at the position P1 in the direction of the central axial X to the total circumferential length of the inner peripheral surface of the stress relieving surface 2b2 (corresponding to the length a in FIG. 13) is 0.5 or more. That is, (b1+b2+b3+b4)/a is 0.5 or more (50% or more on percentage).

As described above, to manufacture the tip rod 2 in one example, a tubular fired body is prepared by firing a prepreg sheet containing carbon fibers impregnated with a synthetic resin. The inclined surface 2b1 and the stress relieving surface 2b2 of the tip rod 2 are obtained by processing the inner peripheral surface of the tubular fired body using a tool such as, for example, a tapered reamer. In one example, the inclined surface 2b1 may first be formed by inserting a tapered reamer into the interior of the tip rod 2 so that its axial direction is slightly inclined with respect to the central axis X (e.g., inclined at an angle ranging from 0.05° to 2°) and scraping the inner peripheral surface of the tip rod 2 and thereafter, the inclined portion 21a may be formed by scraping an area deeper than the inclined surface 2b1 of the inner peripheral surface of the tip rod 2 using a smaller-diameter reamer (e.g. pin reamer). In another example, the inclined surface 2b1 and the inclined portion 21a may be formed by first scraping the inner peripheral surface of the tip rod 2 using a pin reamer to form a narrow groove corresponding to the inclined portion 21a, and then scraping the inner peripheral surface of the tip rod 2 more shallowly than the narrow groove using a tapered reamer. In this manner, the stress relieving surface 2b2 provided with the inclined surface 2b1 and the inclined portion 21a can be formed. The inclined surface 2b1 and the inclined portion 21a may be formed separately, or both may be formed at once.

As described above, the socket-and-spigot core member 6 may be bonded to the inner peripheral surface 2b of the joint 2a of the tip rod 2. In this example, the tip rod 2 and the hand rod 5 are connected via the socket-and-spigot core member 6 by inserting a portion of the socket-and-spigot core member 6 protruding from the rear end 2a1 of the tip rod 2 into the hand rod 5. In this instance, a portion in the vicinity of the distal end of the inner peripheral surface 5b of the hand rod 5 is formed in the same manner as a portion in the vicinity of the rear end of the inner peripheral surface 2b of the tip rod 2. Specifically, an irregular structure corresponding to the inclined surface 2b1 and the stress relieving surface 2b2 is formed in the vicinity of the distal end of the inner peripheral surface 5b of the hand rod 5.

The inclined surface 2b1 and the stress relieving surface 2b2 may be formed in the vicinity of the rear end of the inner peripheral surface of the tip rod 2, and an irregular structure corresponding to the inclined surface 2b1 and the stress relieving surface 2b2 may be formed in the vicinity of the front end of the inner peripheral surface of the hand rod 5. Providing such an irregular structure on both the tip rod 2 and the hand rod 5 can further suppress breakage. In this example, the socket-and-spigot core member 6 may be bonded to the inner peripheral surface of the hand rod 5 or the inner peripheral surface of the tip rod 2.

Next, the fishing rod 101 according to another example will be described with reference to FIG. 16. FIG. 7 is a cross section diagram schematically illustrating a joint structure of an example of the fishing rod 101.

The fishing rod 101 is an ordinarily jointed type fishing rod. The fishing rod 101 has the hand rod 102 and the tip rod 105 that is joined to the hand rod 102 on its tip side. The tip rod 105 is configured to have a diameter smaller than that of the hand rod 102. The outer peripheral surface 105a of the tip rod 105 is formed so that when inserted into the hand rod 102 up to the alignment position, the outer diameter substantially matches the inner diameter of the hand rod 102 at the alignment position. As a result, the tip rod 105 can be joined to the hand rod 102. In the example in FIG. 16, the rear end of the tip rod 105 (the end on the side closer to the hand rod 102) corresponds to a shaft member to be inserted into the rod body.

The inner peripheral surface 102b of the hand rod 102 is configured in the same manner as the inner peripheral surface 2b of the tip rod 2 illustrated in FIGS. 12 to 15. That is, the inner peripheral surface 102b of the hand rod 102 is formed to have an irregular structure corresponding to the inclined surface 2b1 and the stress relieving surface 2b2 in the vicinity of its front end. Though not illustrated, the outer peripheral surface 105a of the tip rod 105 is provided with an inclined portion similar to the inclined portion 6b of the socket-and-spigot core member 6.

Figure 16:
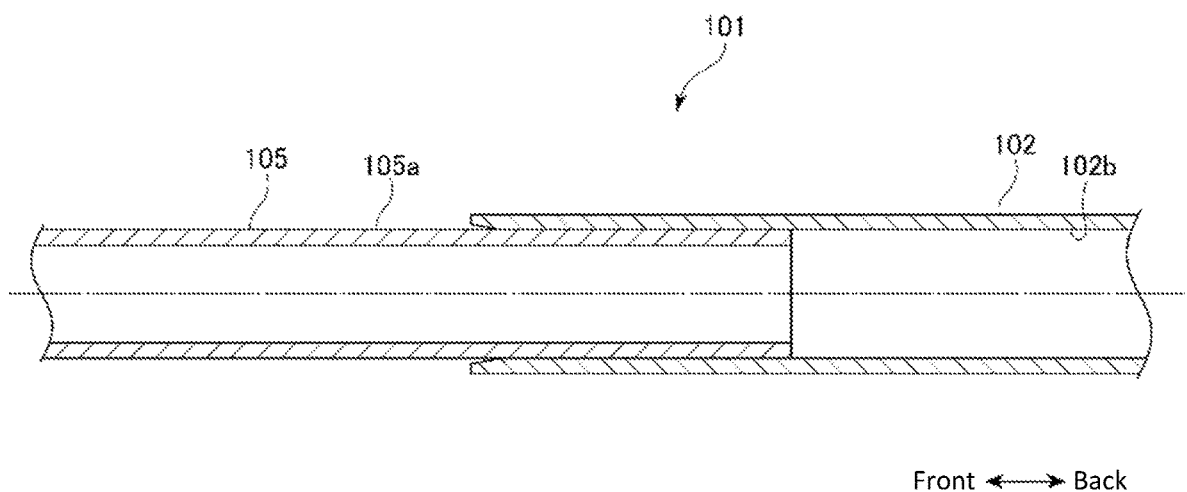
FIG. 16 shows a cross section diagram schematically illustrating a joint structure in a fishing rod according to another example.

In FIG. 16, only two rods (the hand rod 102 and the tip rod 105) are illustrated, but three or more rod bodies joined to one another may be used for an ordinarily jointed type fishing rod. Each of the rod bodies constituting the ordinarily jointed type fishing rod can be joined with a joint structure similar to that of the hand rod 102 and the tip rod 105.

Next, the effect of the above example will be described. The inner peripheral surface 2b of the tip rod 2 into which the socket-and-spigot core member 6 is inserted has, in the vicinity of its rear end, the inclined surface 2b1, the stress relieving surface 2b2, and the cylindrical surface 2b3. The stress relieving surface 2b2 has the inclined portions 21a, 21b, 21c and 21d, and the non-inclined portion 18. An inclined surface 21 and the inclined portions 21a, 21b, 21c and 21d extend at an inclination angle greater than that of the outer peripheral surface of the socket-and-spigot core member 6 with respect to the direction of the central axis X while the non-inclined portion 18 extends parallel or substantially parallel to the direction of the central axis X. When the socket-and-spigot core member 6 is fitted to the inner peripheral surface 2b of the tip rod 2, the inner peripheral surface 2b of the tip rod 2 comes in contact with the socket-and-spigot core member 6 on the alignment position boundary 23b. In this manner, the tip rod 2 is supported by the socket-and-spigot core member 6 on the boundary 23b.

When the tip rod 2 and the hand rod 5 bend during the use of the fishing rod 1, the inner peripheral surface 2b of the tip rod 2 comes in contact with the socket-and-spigot core member 6 not only on the alignment position boundary 23b but also on a stress relieving boundary 23a. Since the stress relieving boundary 23b has a waveform that is convex toward the rear end side of the direction of the central axis X, the stress acting on the socket-and-spigot core member 6 from the inner peripheral surface 2b of the tip rod 2 acts not only at the position P1 of the direction of the central axis X in which the alignment position boundary 23b is located, but also at a position shifted backward from the direction of the central axis X from the position P1. That is, it is possible to spread the stress acting on the socket-and-spigot core member 6 from the inner peripheral surface 2b of the tip rod 2 in a range with an expanse in the direction of the central axis X instead of concentrating the same on a single point in the direction of the central axis X (position of P1).

Figure 13:
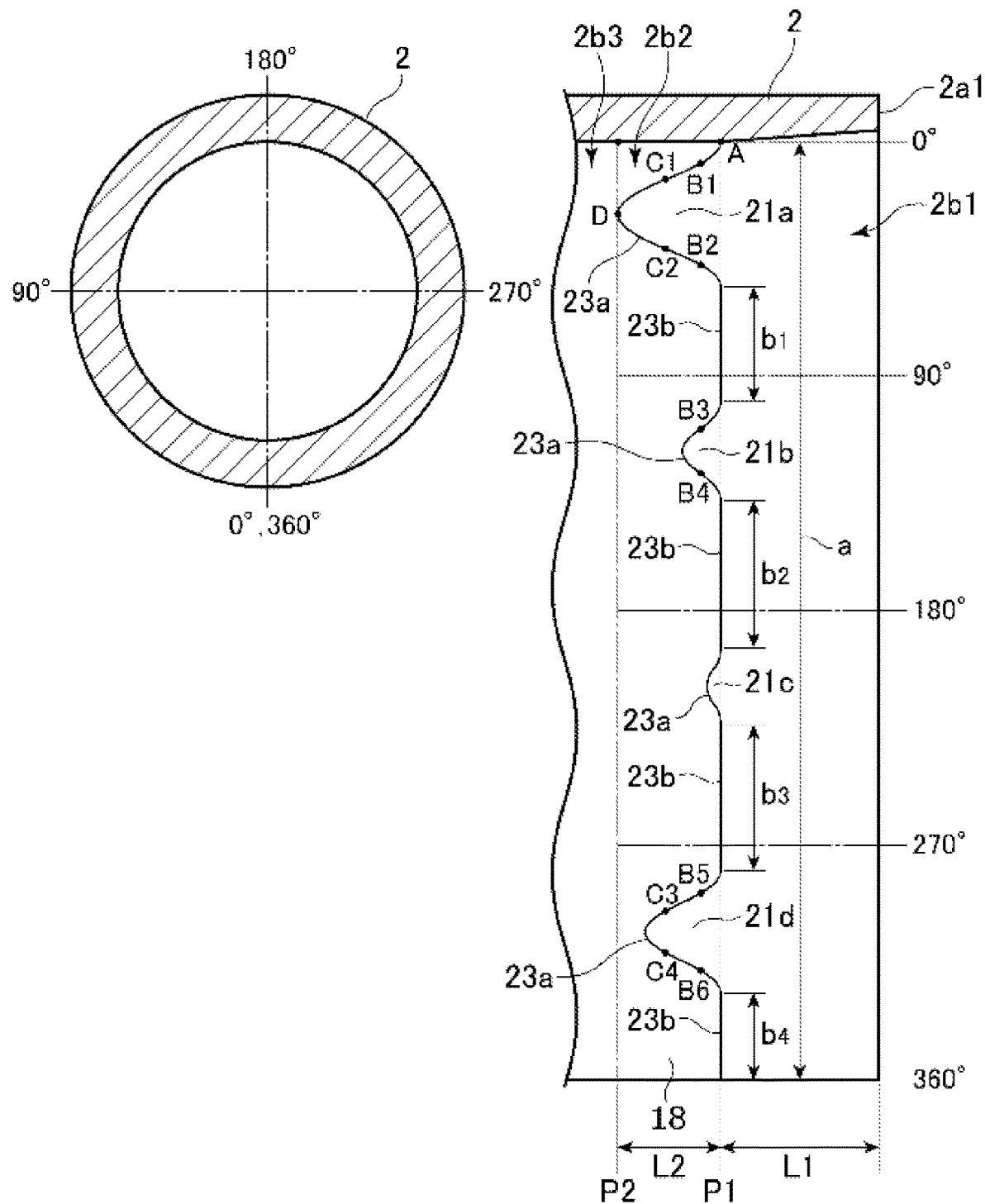
FIG. 13 shows a schematic diagram illustrating another mode of a joint structure of the fishing rod shown in FIG. 3 that is cut open along a line extending in the central axis direction.

For example, FIG. 13 shows positions A, B1, C1 and D that exist on the stress relieving boundary 23a, and that are arranged at different positions in the direction of the central axis X. Before the tip rod 2 bends, the inner peripheral surface 2b of the tip rod 2 is in contact with the socket-and-spigot core member 6 on the alignment position boundary 23b. When the tip rod 2 and the hand rod 5 bend, the stress relieving boundary 23b comes in contact with the socket-and-spigot core member 6 in the ascending order of distance from the alignment position boundary 23b. In the absence of a configuration corresponding to the stress relieving surface 2b2 in the conventional joint structure, the stress on the socket-and-spigot core member concentrates at the rear end of the tip rod 2, which causes breakage of the socket-and-spigot core member. On the other hand, in the example described above, the stress on the socket-and-spigot core member 6 spreads in the direction in the direction of the central axis X because of the stress relieving surface 2b2 so that breakage of the socket-and-spigot core member can be suppressed.

Similarly in the joint structure of the ordinarily jointed type fishing rod 101 shown in FIG. 16, the stress acting from the inner peripheral surface of the hand rod 102 on the tip rod 105 can be spread in the central axis direction. This can suppress breakage of the tip rod 105.

In one example described above, the ratio of the circumferential length of the non-inclined portion 18 at the position P1 in the direction of the central axis X to the total circumferential length of the inner peripheral surface of the stress relieving surface 2b2 is 0.5 or more. This makes it possible to reliably hold the socket-and-spigot core member 6 or the tip rod 105 at the position P1 which is an alignment position while spreading the stress on the socket-and-spigot core member 6 or the tip rod 105 in the central axis direction.

The effect referred to above is particularly exerted by the inclined portions 21a, 21b, 21c and 21d that exist in the compressed area R1. The inclined portions 21a, 21b, 21c and 21d outside the compressed area R1 may be omitted.

Figure 17:
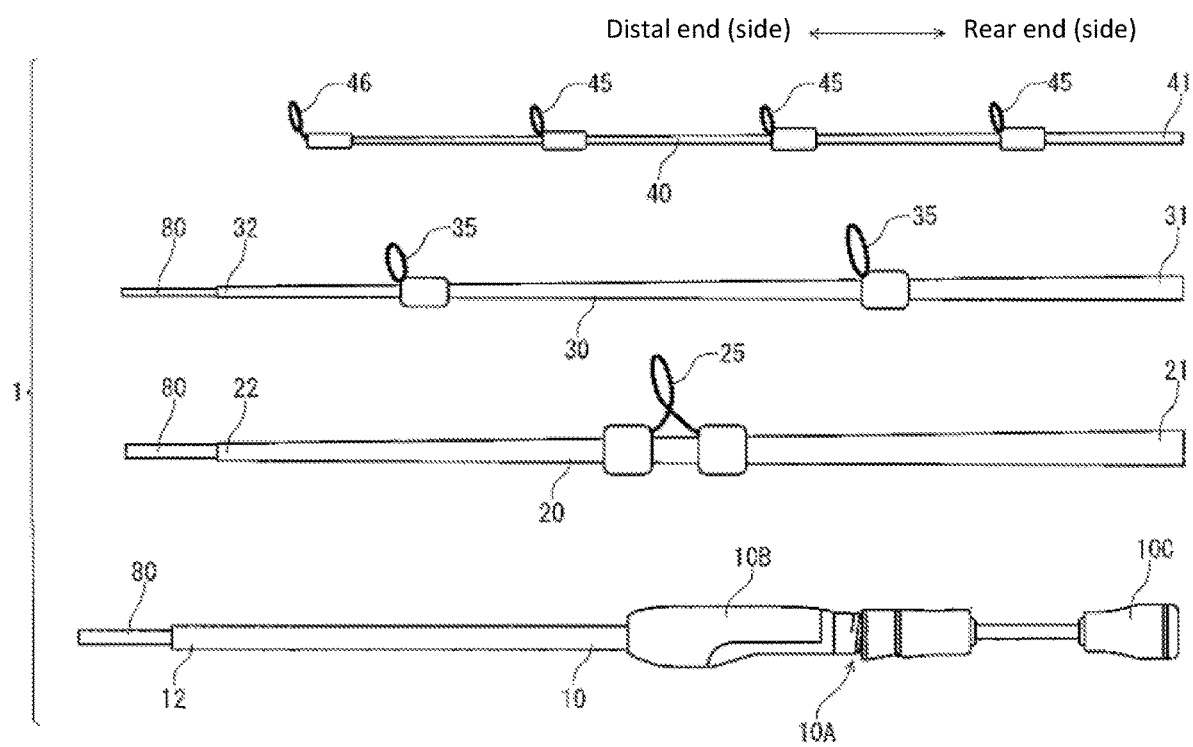
FIG. 17 shows a diagram illustrating an example of a socket-and-spigot jointed type fishing rod.

FIG. 17 is a diagram illustrating an example of a socket-and-spigot jointed type fishing rod.

The fishing rod 1 has a four-piece joint structure including three rods (middle rods 20 and 30 and a tip rod 40) that are sequentially detachably connected to the front end side of a base rod 10, and the front end of each rod has a joint structure (socket-and-spigot joint) in which a socket-and-spigot joint 80 is fitted and fixed. That is, a rear end 21 of the middle rod 20 is fitted and fixed to the socket-and-spigot joint 80 fixed to a distal end 12 of the base rod 10, a rear end 31 of the middle rod 30 is fitted and fixed to the socket-and-spigot joint 80 fixed to a distal end 22 of the middle rod 20, and a rear end 41 of the tip rod 40 is fitted and fixed to the socket-and-spigot joint 80 fixed to a distal end 32 of the middle rod 30. For this reason, the socket-and-spigot joint 80 is fitted and fixed to the distal end of each rod so that the distal end side of the socket-and-spigot joint is exposed in a way that allows the inner peripheral surface of the opening of the rear end of a small-diameter rod to be fitted and fixed.

In this example, the fishing rod 1 as a whole has a four-piece joint structure, but the number of rods to be jointed is not limited, and a plurality of rods are connected via the socket-and-spigot joint 80 to form a single fishing rod.

In the following description, the large-diameter rod and the small-diameter rod mean the relationship of the rods connected to each other (jointed) via the socket-and-spigot joint 80. Therefore, the middle rod 20 shown in FIG. 17 is a large-diameter rod in relation to the middle rod 30, and is a small-diameter rod in relation to the base rod 10.

In the enlarged diagram of a joint described below, a large-diameter rod is denoted by the middle rod 20, and a small-diameter rod is denoted by the middle rod 30. That is, in the fishing rod with a four-piece joint structure as in this example, since the joint structures of the rods are substantially the same, the joint relationship between the middle rod 20 and the middle rod 30 is illustrated and described as an example. Further, as illustrated in FIG. 1, the distal end (distal side) means the distal end side of the fishing rod, and the rear end (rear end side) means the tip-end side of the fishing rod.

The fishing rod 1 has a configuration in which the lengths of the middle rods 20 and 30 and the length of the tip rod 40 are shorter than that of the base rod 10. The middle rods 20 and 30 may have the same length, and the tip rod 40 may have a length shorter than the middle rods 20 and 30. Further, the rods (from the middle rod 20 to the tip rod 40) may be configured to be gradually shorter. Each of the rods 10, 20, 30 and 40 referred to above is configured as a tubular member, and is formed, as known, into a tubular shape by winding a prepreg sheet containing reinforced fibers impregnated with a synthetic resin on a metal core, curing the synthetic resin by heat treatment and then, removing the metal core. In this example, each rod may be provided with a portion joined via a socket-and-spigot joint that is configured in a tubular shape, and other portions in a solid structure.

The base rod 10 is provided with a reel sheet 10A on which a reel is mounted, and grips (a front grip 10B and a rear grip 10C) at the front and rear thereof, and the grips 10B and 10C are formed of a material which is light in weight and comfortable to grip, for example, a foam material such as EVA that has flexibility and cork.

A fishing line guide for inserting a fishing line unwound from a reel fixed to the reel sheet 10A is mounted on the rod 20, 30 and 40, respectively. Specifically, one fishing line guide 25 is mounted on the rod 20, two fishing line guides 35 are mounted on the rod 30, and three fishing line guides 45 are mounted on the tip rod 40. A tip guide 46 is mounted on the tip of the tip rod 40.

Figure 18:
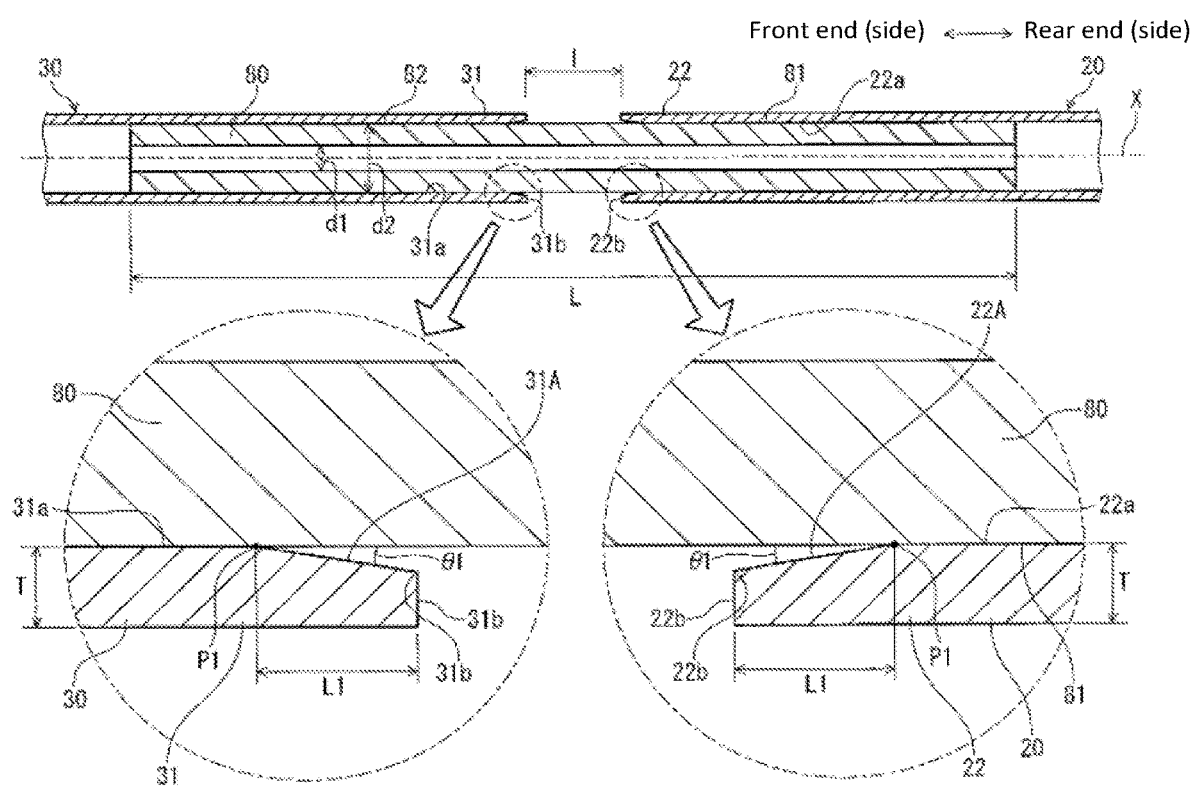
FIG. 18 shows a longitudinal cross section diagram illustrating an enlarged socket-and-spigot joint in the structure shown in FIG. 1.

FIG. 18 is a diagram illustrating an enlarged joint area of the middle rod 20 (hereinafter a large-diameter rod 20) and a middle rod 30 (hereinafter a small-diameter rod 30).

The socket-and-spigot joint 80 is press-fitted from the opening side of the distal end 22 of the large-diameter rod 20 and fixed, and an outer peripheral surface 81 of the rear end side of the socket-and-spigot joint 80 is bonded and fixed to an inner peripheral surface 22a of the opening of the distal end of the large-diameter rod 20. The socket-and-spigot joint 80 protrudes from an opening edge 22b of the distal end 22 of the large-diameter rod 20, and an inner peripheral surface 31a of the opening of the rear end 31 of the small-diameter rod 30 is press-fitted and fixed to an outer peripheral surface 82 on the protruding distal end side. In this example, the small-diameter rod 30 is not press-fitted on the socket-and-spigot joint 80 in the entire longitudinal direction, but is press-fitted and fixed between an opening edge 31b of the rear end 31 of the small-diameter rod 30 and the opening edge 22b of the distal end 22 of the large-diameter rod 20 via a gap I.

The gap I exists in the joint areas of all the rods, and the length of the gap I is formed to be substantially the same in all the joints.

The socket-and-spigot joint 80 is preferably formed of a material that allows a reduction in weight, and for example, a material formed in a tubular shape (cylindrical shape) by firing a prepreg sheet containing carbon fibers impregnated with a synthetic resin can be used. The socket-and-spigot joint 80 may have a uniform outer diameter over its entire length, or may have a tapered surface (a tapered surface to which the small-diameter rod is fixed by fitting an opening of a rear end of the small-diameter rod) that shrinks in diameter toward the tip. Further, the socket-and-spigot joint 80 may be formed in a solid shape, or may be formed in a hollow shape for reduction in weight as in this example. The socket-and-spigot joint 80 of this example is formed, for example, such that the length L in the central axis direction is 50 to 150 mm, an inner diameter d1 is 2 to 10 mm, and an outer diameter d2 is 3 to 15 mm, which are changed as necessary depending on the thickness of the rod constituting the fishing rod and the joint. Further, where the tapered surface is formed on the outer peripheral surface of the socket-and-spigot joint, the tapered surface may be formed only in the area of joint with the small-diameter rod.

In the socket-and-spigot jointed type fishing rod as described above, when the entire fishing rod bends when fish is hooked at the time of actual fishing, stress concentrates, and bending and shearing stresses act, on part of the outer peripheral surface of the socket-and-spigot joint 80, which causes, for example, breakage of the socket-and-spigot joint 80. This is because, when the fishing rod bends, an edge 22b' of an opening edge 22b of the distal end 22 of the large-diameter rod 20 and an edge 31b' of an opening edge 31b of the rear end 31 of the small-diameter rod 30 are in line contact with the outer peripheral surface of the socket-and-spigot joint 80 in a ring shape.

Thus, in the joint structure in which a ring-shaped line contact is made with the outer peripheral surface of the socket-and-spigot joint, stress concentration becomes remarkable, and rattle and fixation are often caused at the time of mounting and, therefore, it is difficult to create a tight joint. In this example, as described later, inclined surfaces (tapered surfaces) 22A and 31A are formed on the opening inner peripheral surfaces 31a and 22a, respectively so that a gap (micro gap) is interposed on the outer peripheral surface of the socket-and-spigot joint, the edges 22b' and 31b' are made contact with the outer peripheral surface at the internal rising position P1 (a position at which the inclined surface rises from the outer peripheral surface of the socket-and-spigot joint), instead of being made line contact perpendicular to the outer peripheral surface so that stress concentration is alleviated. That is, by reducing the inclination angle θ1 from the rising position P1, stress acting on the outer peripheral surface of the socket-and-spigot joint is alleviated.

Alleviation of stress by forming an inclined surface will be described. Since the same phenomenon occurs in the end areas of the large-diameter rod and the small-diameter rod, an inclined surface 31A on the small-diameter rod side will be described here.

As shown in FIG. 18, it is possible to alleviate stress concentration arising as a result of ring-shaped line contact by forming, at the rear end 31 of the small-diameter rod 30, the inclined surface 31A (a tapered surface with the inclination angle θ1 described later) gradually expanding in diameter from the rising position P1 toward the rear end side. In other words, on the inner peripheral surface of the opening of the small-diameter rod 30, the inclined surface 31A is provided that shrinks in diameter by a constant axial length L1 from the opening edge 31b toward the distal end side and that is inclined at the inclination angle θ1 with respect to the central axis X of the small-diameter rod to have a gap (micro gap) with the outer peripheral surface 82 of the socket-and-spigot joint 80. Since the inclined surface 31A is in contact with the outer peripheral surface 82 of the socket-and-spigot joint 80 at the slight inclination angle θ1 at the rising position P1, there is an effect of relaxation of pressing force (shearing stress) when the small-diameter rod actually bends, as compared with when it is in contact perpendicular to the outer peripheral surface 82.

In this example, forming the inclined surface 31A at the rear end 31 of the small-diameter rod 30 causes the wall of the rod to become thinner toward the end, and may cause a fracture or the like with the reduction in strength and therefore, it is not appropriate to set the axial length L1 forming the inclined surface 31A too long. 10 mm or less is appropriate at longest, and if it is 5 mm or less, or preferably 1 mm to 3 mm, it is possible to secure sufficient strength without thickening the tapered area as in the above-mentioned Japanese Utility Patent Application Publication No. H05-068270.

In the configuration shown in FIG. 18, since the outer peripheral surface of the socket-and-spigot joint 80 is substantially straight extending in the axial direction, the inclination angle θ1 is shown as an angle with the outer peripheral surface of the socket-and-spigot joint 80, but it means in practice an inclination angle with the central axis X of the small-diameter rod.

The inclination angle θ1 shown in FIG. 18 is an important parameter to suppress breakage due to stress concentration and therefore, is inoperable if it is too large (simply forming an inclined surface sharpens the edge at the rising position P1, which cannot effectively alleviate the stress). The following tests were therefore conducted to identify angles with which breakage due to stress concentration can be suppressed in practice.

A four-point bending test compliant with JIS K7074 was conducted, and the bending fracture strength was measured with respect to each test piece in which a small-diameter rod and a large-diameter rod were joined together via a socket-and-spigot joint in the same manner as in the joint structure shown in FIG. 18.

Figure 19:
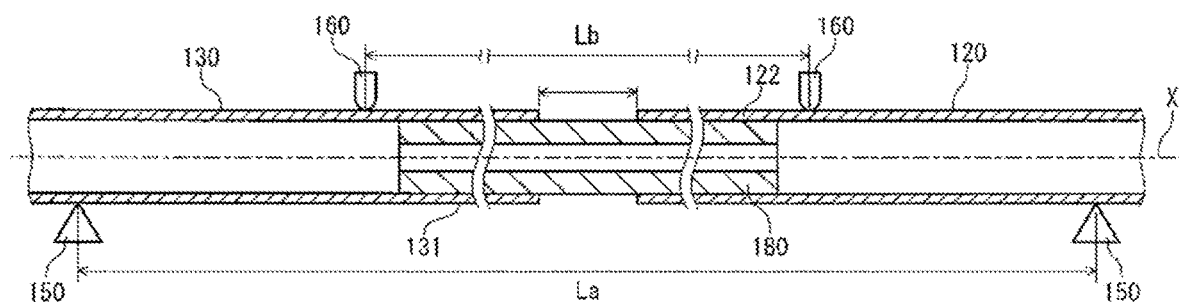
FIG. 19 shows a diagram schematically illustrating the method of a four-point bending test.

FIG. 19 is a schematic diagram illustrating an outline of a four-point bending test.

A small-diameter rod 130 and a large-diameter rod 120 shown in FIG. 19 are both formed by winding a prepreg sheet containing carbon fibers impregnated with a synthetic resin on a mandrel, and firing the same and removing the core by conventional means. The inner diameter of the small-diameter rod 130 was 8.09 mm and the inner diameter of the large-diameter rod was 8.20 mm, and an inclined surface (with the inclination angle θ1) gradually expanding in diameter toward the rear end side was formed at a rear end 131 of the small-diameter rod 130, and an inclined surface (with the inclination angle θ1) gradually expanding in diameter toward the distal end side was also formed at the distal end 122 of the large-diameter rod 120, in the same manner as in the configuration shown in FIG. 18. In this example, the axial length in which an inclined surface is formed (axial length L1 shown in FIG. 18) was set to 2 mm.

Seven small-diameter rods 130 with different inclination angles θ1 (0.1°, 1.0°, 1.2°, 10°, 15°, 20° and 30°), and seven large-diameter rods 120 with different inclination angles θ1 (0.1°, 1.0°, 1.2°, 10°, 15°, 20° and 30°) like the small diameter rods were prepared, and the small-diameter rods and the large-diameter rods with the same inclination angles were connected via a socket-and-spigot joint 180.

The socket-and-spigot joint 180 is formed by winding a prepreg sheet containing carbon fibers impregnated with a synthetic resin on a mandrel, and firing the same and removing the core by conventional means in the same way as rods. The inner diameter of the socket-and-spigot joint 180 as 3.0 mm, the outer diameter on the distal end side was 8.0 mm, and the length was 120 mm. In this example, the outer diameter of the socket-and-spigot joint 180 is substantially straight in the axial direction, and it was fixed in the vicinity of its intermediate position when press-fitting the small-diameter rod 130 in the socket-and-spigot joint 180.

Figure 20:
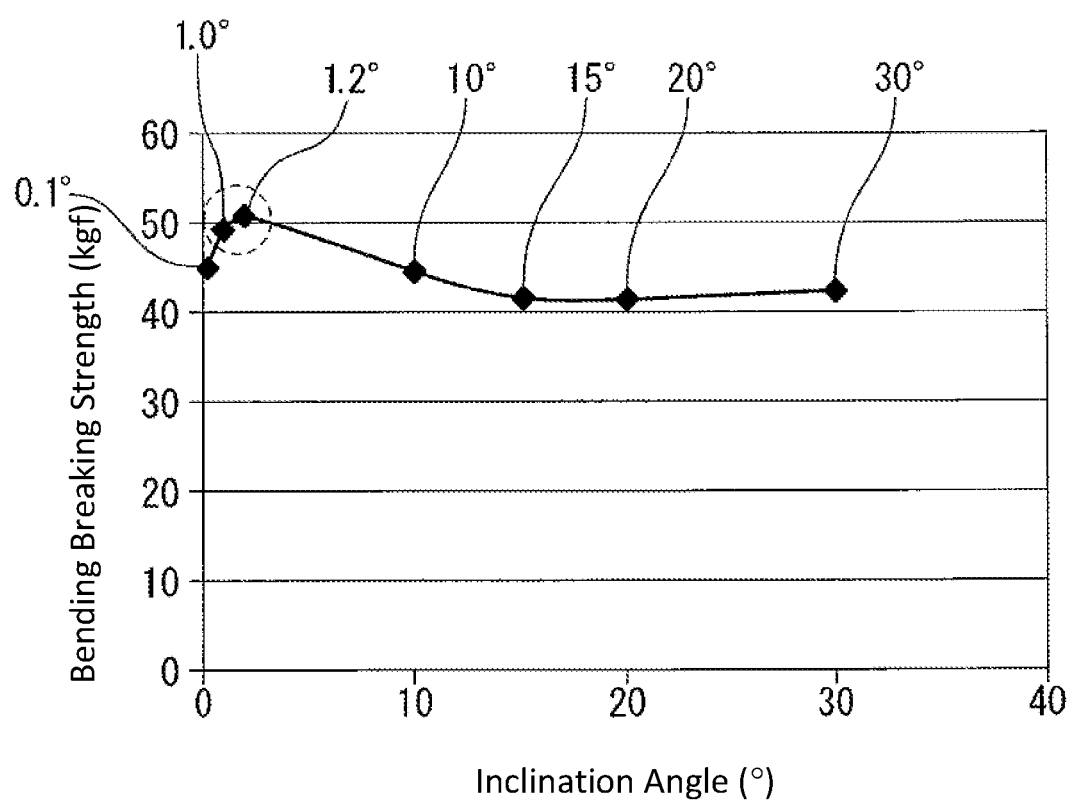
FIG. 20 shows a graph illustrating the measurement results of bending fracture strength from the test shown in FIG. 3.

Using the test apparatus for installing the above-mentioned test pieces (seven test pieces in which a small-diameter rod and a large-diameter rod are connected via an socket-and-spigot joint), the bending fracture strength of each test piece was measured under the condition that a distance La between the fulcrums 150 is 800 mm, a distance Lb between indenters 160 is 240 mm and the speed is 50 mm/min, as a result of which the measurement result of FIG. 20 was obtained. FIG. 4 is a graph plotting the bending fracture strength measured by the four-point bending test described above, the horizontal axis shows the inclination angle θ1 of each test piece, the vertical axis shows the measured bending fracture strength (bending fracture strength of the socket-and-spigot joint 180).

The graph shows that the bending fracture strength of the socket-and-spigot joint changes with the change of the inclination angle θ. As described above, it can be seen that the bending fracture strength decreases when the inclination angle θ1 exceeds 10°, and becomes substantially constant at an angle of more than about 15°. This may be because if the inclination angle θ1 becomes large to some extent, it is impossible to expect a sufficient stress relieving effect due to a sudden angle change (edge) at the rising position P1 when the rod bends.

As described above, when the axial length of the inclined surface formed on the rear end 131 of the small-diameter rod 130 is set to 2 mm, the inclination angle θ1 at which the bending fracture strength is strong is 10° or less, preferably 5° or less, and more preferably within 1° to 3° enclosed by the dotted line. That is, if the inclination angle θ1 exceeds 10°, when the rod bends, stress is increasingly concentrated at the rising position of the inclined surface (shown by P1 in FIG. 18), whereby breakage is much more likely to occur. Further, though stress can be alleviated even when it is set to 1° or less, if it is too small (0.1° or less), the edge 31b' (see FIG. 18) of the opening edge of the rear end may come in line contact with the outer peripheral surface of the socket-and-spigot joint, whereby breakage is much more likely to occur.

For this reason, if the inclined surface 31A formed on the inner peripheral surface of the opening of the small-diameter rod has the inclination angle θ1 of 1° to 3° with respect to the central axis X of the small-diameter rod, and the axial length L1 is 1 mm to 3 mm, stress concentration on the outer peripheral surface of the socket-and-spigot joint 80 can be effectively alleviated without damaging the opening of the small-diameter rod 30 to effectively prevent breakage of the socket-and-spigot joint. In this example, if the axial length L1 is too long, a fracture or the like occurs on the opening edge 31b as described above and therefore, when the thickness at the opening edge 31b is defined as T, setting L1 to 10 T or less makes the opening less breakable.

Verification actually conducted using a large number of test pieces returned a good result that when setting the axial length L1 of the inclined surface to 2 mm, setting the inclination angle θ1 to approximately 2° alleviated stress concentration on the outer peripheral surface of the socket-and-spigot joint, which decreased breakage and the like. In this example, it is not necessary to form the inclination angle θ1 of approximate 2° over the entire circumference, and there may be some variation in the circumferential direction as long as the inclination angle θ1 is 10° or less, preferably 1° to 5°. Further, it is not necessary to form such inclined surface over the entire circumference, and it may be formed within a certain range in which the pressing force acts on the outer peripheral surface of the socket-and-spigot joint (e.g., in the range R1 shown in FIGS. 24 and 25) when the fishing rod bends.

Figure 21:
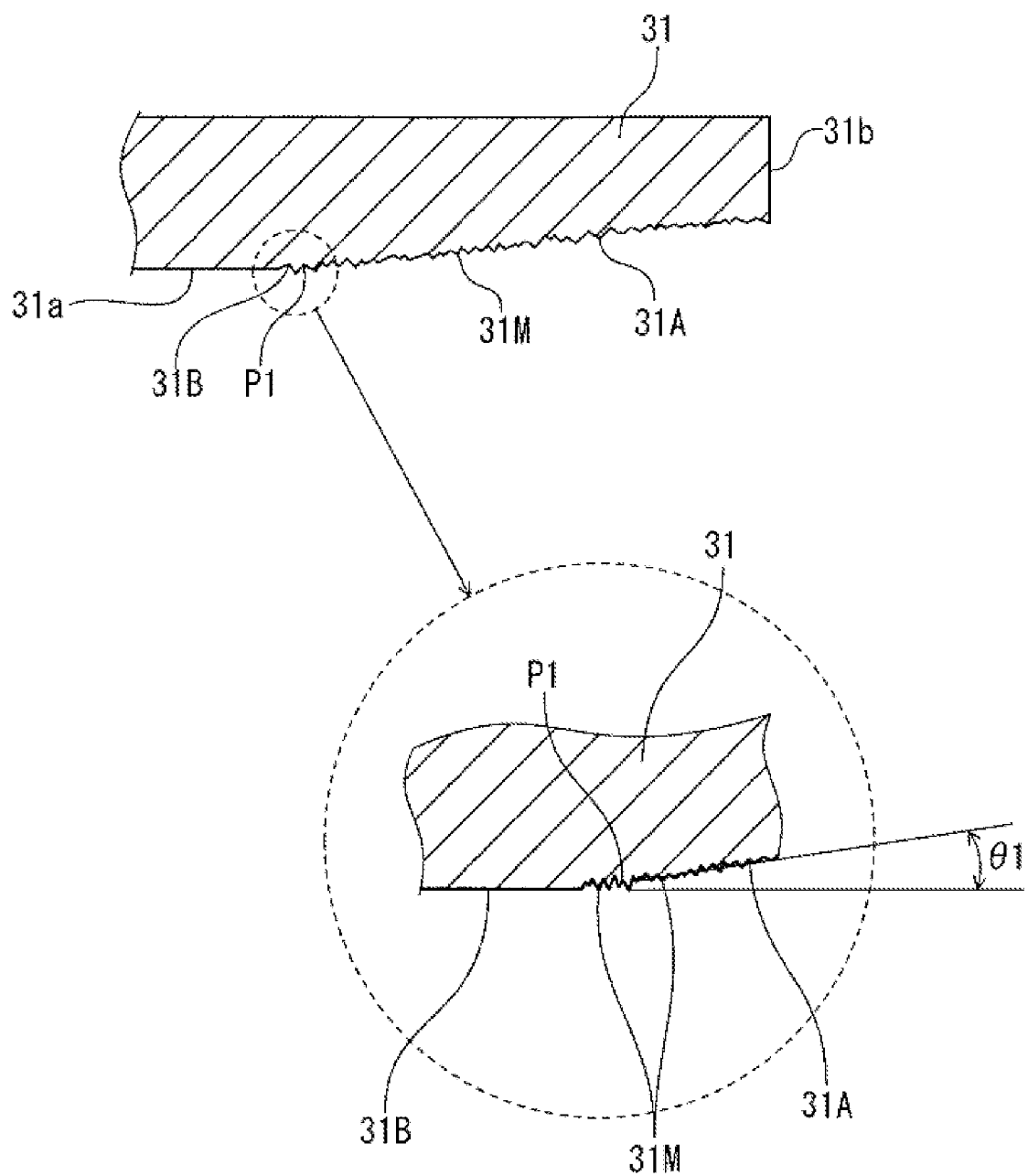
FIG. 21 shows a cross section diagram illustrating an enlarged joint area of a small-diameter rod.

FIG. 21 is a cross section diagram illustrating the enlarged joint area of a small-diameter rod (the inclined surface 31A).

As described above, stress concentration can be alleviated by setting the inclination angle θ1 from the rising position P1 to 10° or less, preferably 1° to 3°. In such a joint mode, the surface of the inclined surface 31A is subjected to roughening treatment to form a rough surface portion 31M. The rough surface portion 31M is formed on the entire surface of the inclined surface 31A as it can be easily processed, but it may be formed at least in the vicinity of the rising position P1, or preferably in an area including the rising position P1 having ring-shaped contact with the outer peripheral surface of the socket-and-spigot joint.

The roughening mode will be described specifically.

Figure 22:
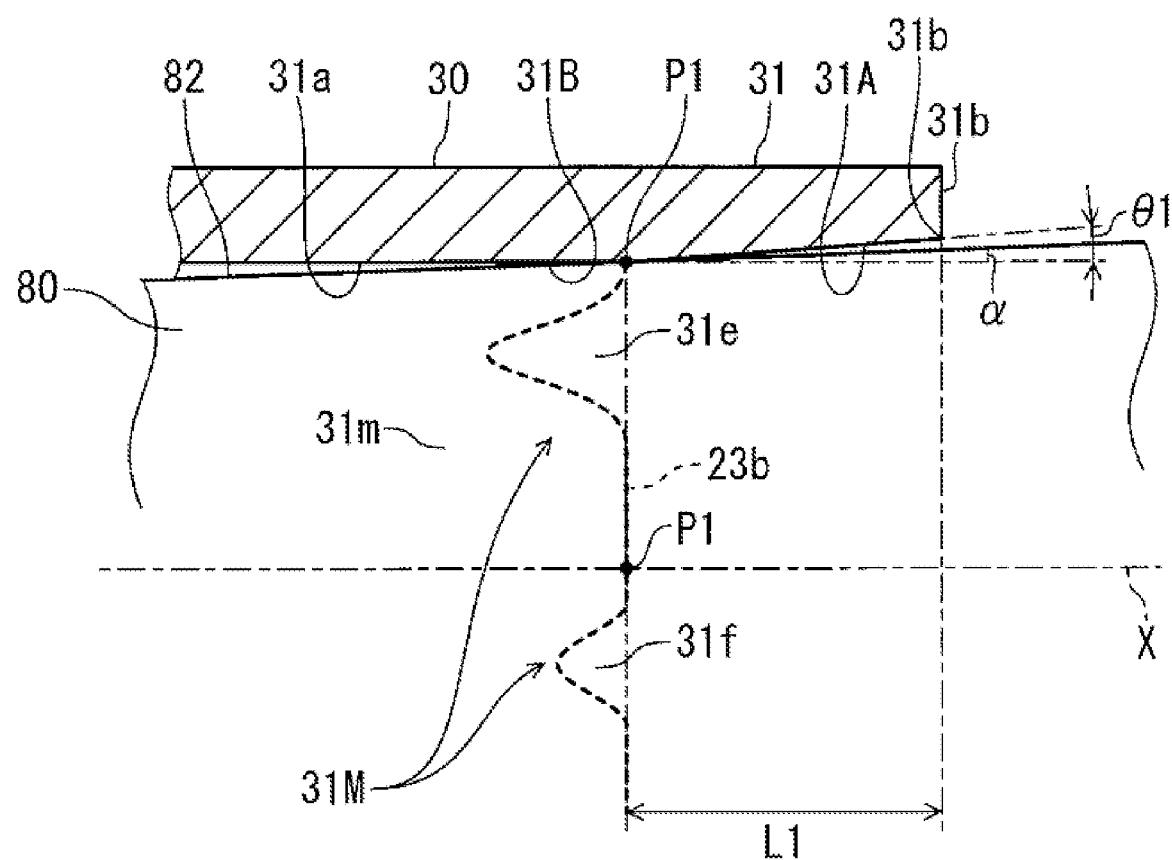
FIG. 22 shows a diagram illustrating an enlarged joint area between a small-diameter rod and a socket-and-spigot joint.
Figure 23:
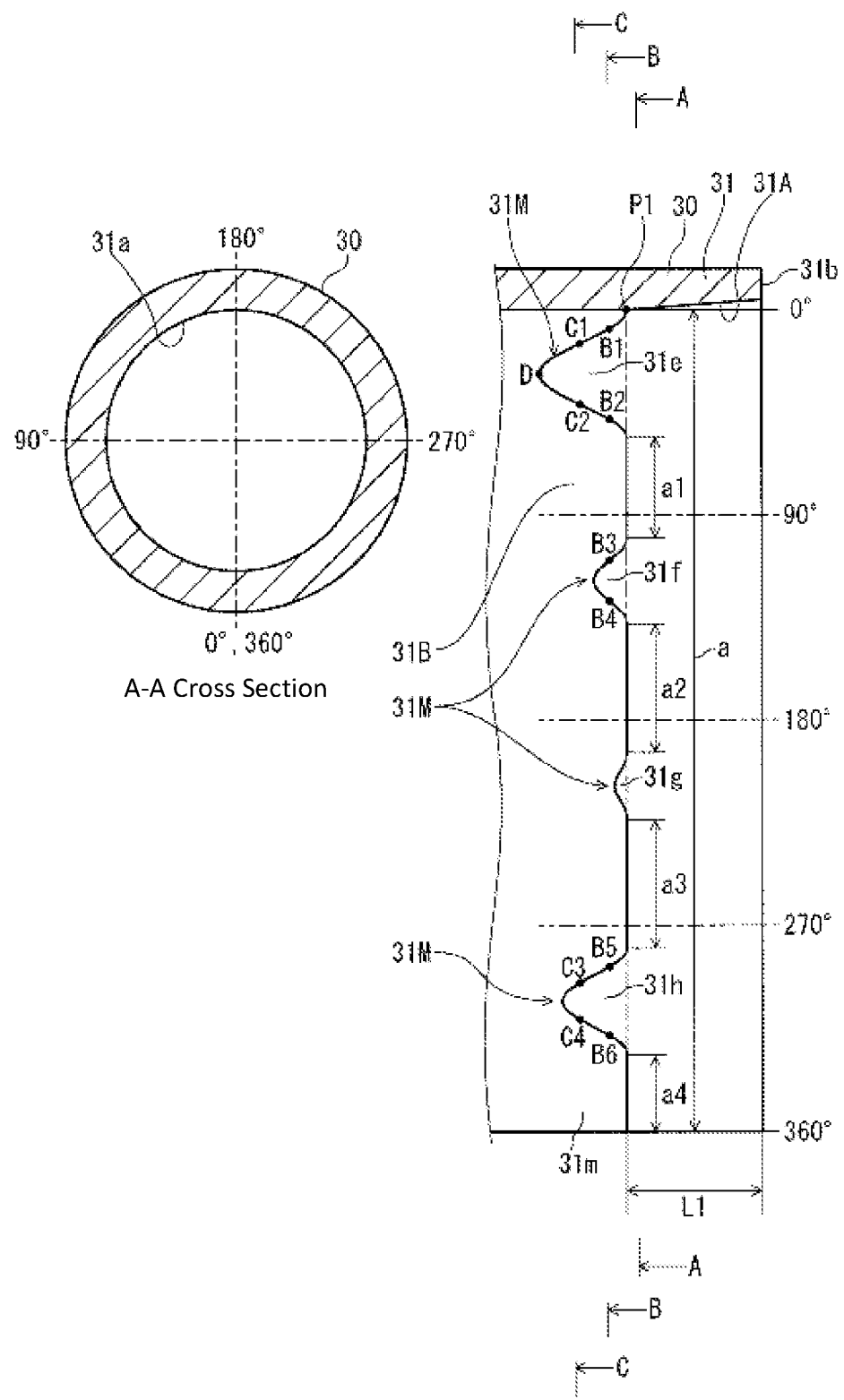
FIG. 23 shows a schematic diagram illustrating the joint structure shown in FIG. 6 that is cut open along a line extending in the central axis direction, and a cross section diagram along line A-A in said schematic diagram.
Figure 24:
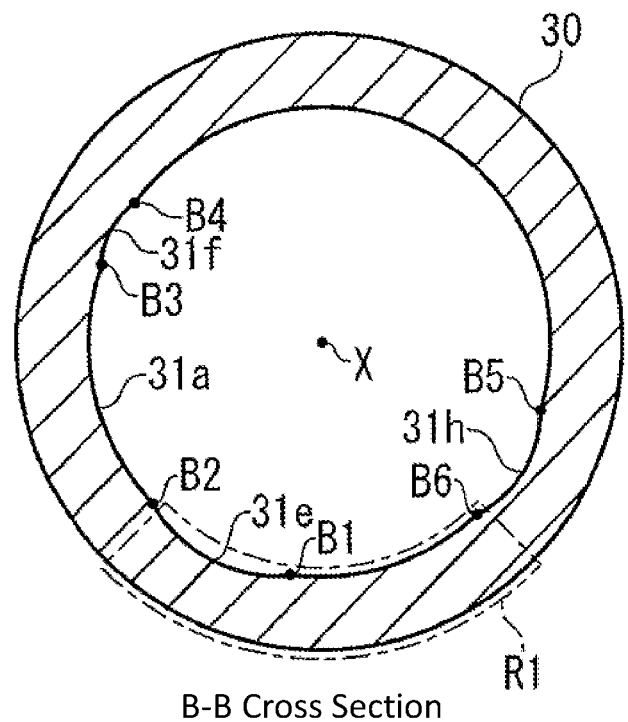
FIG. 24 shows a cross section diagram along line B-B in FIG. 7.
Figure 25:
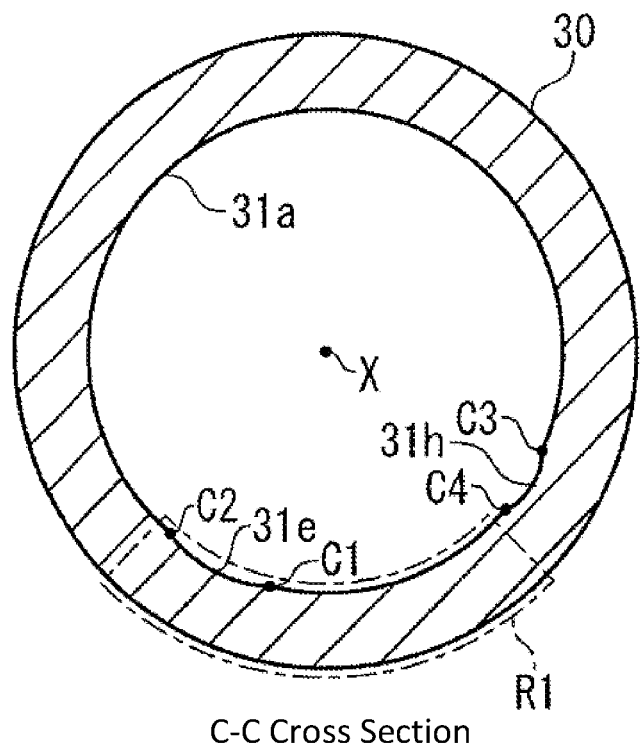
FIG. 25 shows a cross section diagram along line C-C in FIG. 7.
Figure 26:
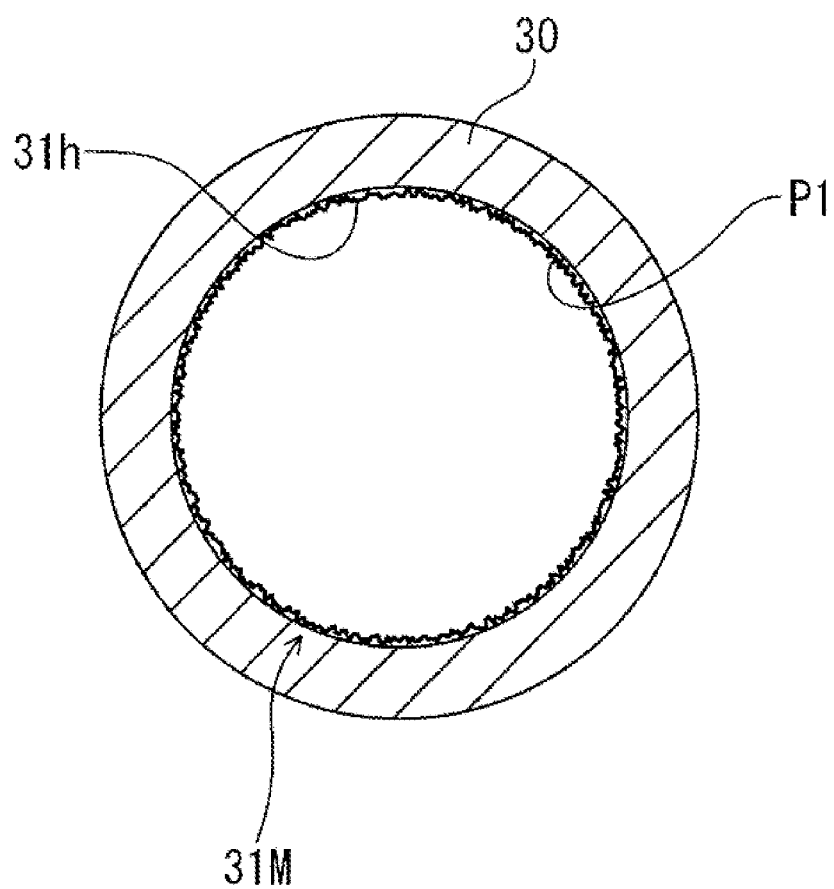
FIG. 26 shows a cross section diagram at a position P1 in FIG. 7, illustrating a micro irregular structure.

FIGS. 22 to 26 are diagrams illustrating joint areas of socket-and-spigot joints and small-diameter rods, FIG. 22 is a diagram illustrating the enlarged joint area of a small-diameter rod and a socket-and-spigot joint, FIG. 23 is a schematic diagram illustrating the joint structure shown in FIG. 22 that is cut open along a line extending in the central axis direction, and a cross section diagram along line A-A of the schematic diagram, FIG. 24 is a cross section diagram along line B-B in FIG. 23, FIG. 25 is a cross section diagram along line C-C in FIG. 23, and FIG. 26 is a cross section diagram along the rising position P1 in FIG. 23 that illustrates a micro irregular structure. "Roughening" means a number of micro grooves extending in the axial direction over the circumferential direction, and micro irregularities protruding in the radial direction over the circumferential direction.

As described above, the large-diameter rod 20 and the small-diameter rod 30 are joined at a predetermined position by press-fitting the rear end 31 of the small-diameter rod 30 into the socket-and-spigot joint 80, and it is possible to suppress stress concentration on the socket-and-spigot joint even when the fishing rod bends if the inclined surface 31A is formed, at the inclination angle θ1, on the inner peripheral surface 31a of the opening of the rear end portion 31. Further, the rising position P1 is a position to which the small-diameter rod and the socket-and-spigot joint are fitted and fixed.

In the example shown in FIG. 22, the small-diameter rod on the distal end side of the rising position P1 of the inclined surface 31A is formed in a substantially straight shape, and an inclined surface (tapered surface) gradually expanding in diameter toward the rear end is formed on the outer peripheral surface 82 of the socket-and-spigot joint 80 so that the small-diameter rod 30 can be fixed to the outer peripheral surface of the socket-and-spigot joint 80 when the small-diameter rod 30 is press-fitted on the outer peripheral surface of the socket-and-spigot joint 80 (in FIG. 22, the inclination angle with the center axis X is denoted by α). If the inclination angle α is smaller than the inclination angle θ1 of the inclined surface 31A at the rear end 31 of the small-diameter rod 30, it is possible to fix the inclination angle α with the socket-and-spigot joint 80 at a predetermined position when press-fitting the small-diameter rod 30. Specifically, if the inclination angle θ1 of the inclined surface 31A is set to approximately 2°, the inclination angle α of the socket-and-spigot joint 80 can be fixed at a predetermined position when press-fitting the small-diameter rod 30, as long as the inclination angle α is approximately 1° or less (it is set to approximately 0.4° in the example).

The actual joint is made at the rising position P1, and the inclined surface 31A is gradually away from the outer peripheral surface of the socket-and-spigot joint 80 toward the rear end side from the rinsing position P1 because it is inclined at the inclination angle θ1 as described above; therefore, a gap (micro gap) is formed due to the inclination angle θ1 between the socket-and-spigot joint 80 and the outer peripheral surface. It is possible to bend the inclined surface 31 A, by precisely machining the same, at the rising position P1 where lines intersect at the inclination angle θ1, whereby an accurate fitted and fixed position can be obtained. In this example, the rising position P1 is not in a bending state where lines intersect but in a curved state, stress may be more effectively relieved though the accuracy of the fitted and fixed position is somewhat inferior. In this example, the rising state at the rising position P1 may have any configuration.

In the structure shown in FIG. 22, the small-diameter rod 30 bends with the bending of the fishing rod (it is curved with the bending in the arrow direction). As described above, since the inclined surface 31A rising at the inclination angle θ1 from the rising position P1 is formed on the inner peripheral surface of the rear end 31 of the small-diameter rod 30, the edge 31b' of the opening edge 31b of the rear end 31 can come in contact in the vicinity of the rising position P1 without contacting on a line whereby stress concentration is suppressed to allow effective prevention of breakage of the socket-and-spigot joint 80.

In such a configuration, it is possible to alleviate stress concentration by forming the rough surface portion 31M as illustrated in FIG. 21 in the vicinity of the rising position P1 of the inclined surface 31A. That is, since an inclined surface with the inclination angle α as described above is formed on the outer peripheral surface of the socket-and-spigot joint 80, the contact pressure that presses the outer peripheral surface 82 of the socket-and-spigot joint 80 acts in the vicinity of the rising position P1 when the small rod bends though the distance from the inner peripheral surface of the small-diameter rod increases toward the distal end on the distal end side of the rising position P1.

Therefore, the rough surface portion 31M is formed in the area including the rising position P1 serving as a base point of the inclined surface 31A.

The rough surface portion 31M may be formed in the vicinity of the rising position P1, preferably on the inner peripheral surface 31B on the distal end side of the rising position P1 (inclusive), and more preferably in the front-back area in the axial direction including (across) the rising position P1. It is made possible to effectively weaken the pressing pressure acting on the outer peripheral surface of the socket-and-spigot joint 80 from the inner peripheral surface 31a of the opening of the small-diameter rod by forming such a rough surface portion.

Specifically, the rough surface portion 31M is composed of a plurality of concave portions (micro grooves) 31e, 31f, 31g and 31h that are concave along the axial length direction and that are formed to be discontinuous over the circumferential direction. That is, the inner peripheral surface 31m (non-concave portion) of the other portions is flat whereby stress can be relieved by making it contact with the outer peripheral surface of the socket-and-spigot joint 80 when the small-diameter rod bends.

The shapes of the concave portions 31e, 31f, 31g and 31h are not particularly limited, but as described above, an inclined surface with the inclination angle α that shrinks in diameter toward the distal end side is formed on the outer peripheral surface 82 of the socket-and-spigot joint 80, and the distance from the inner peripheral surface 31a of the small-diameter rod increases toward the distal end side. Therefore, each concave portion is preferably inclined to become shallower toward the distal end side of the rising position P1. Further, each concave portion also preferably and gradually become narrower in width toward the distal end side of the rising position P1.

Further, taking into account the actual deflection of the small-diameter rod, it is preferable that concave portions vary in size depending on the circumferential direction. That is, when the fishing rod bends, the lower side (the side shown enlarged in FIG. 18) is the compression side, and the upper side is the tensile side (the joint is deflected into an arch in FIG. 18). In this example, as shown in FIG. 23, when the lowermost position in the circumferential direction (a position of a fishing line guide in a fishing rod provided with a spinning reel) is defined as position 0°, the fishing rod bends and a pressing pressure acts on the outer peripheral surface of the socket-and-spigot joint within ±30° around the position 0° (such an arc-like range is denoted by numeral reference R1 in FIGS. 24 and 25).

For this reason, it is preferable that the concave portions 31e and 31h formed in the area where such large deflection occurs are larger in width and longer in the axial direction than the concave portions 31f and 31g in other portions. For example, a top D of the concave portion 31e is extended further toward the distal end side in the axial direction than the other concave portions, in the vicinity of which stress is also made easily relieved by accommodating deformation. That is, when forming a plurality of concave portions as described above as the rough surface portion 31M, it is possible to efficiently alleviate the pressing pressure acting on the outer peripheral surface 82 of the socket-and-spigot joint 80 without causing degradation in strength by appropriately setting the size of each concave portion (width, axial length, etc.) with the state when the fishing rod bends in mind. In this example, when a plurality of concave portions is formed at the rising position P1 along the circumferential direction, a groove that is excessively wide in the circumferential direction at the rising position P1 of each concave portion causes degradation in strength. It is therefore preferable to ensure that the circumferential length obtained by summing the non-concave portions 31m (a1+a2+a3+a4 in FIG. 23) is 50% or more of the circumferential length at that position.

With respect to the concave portions referred to above, excessively large concave portion causes degradation in strength. Though the size of the concave portion varies depending on the diameter and the like of the small-diameter rod, the width, depth and axial length of its groove may be 5 μm or less, preferably 1 to 3 μm, thereby effectively relieving stress concentration without causing degradation in strength.

The rough surface portion 31M may be composed not only of a plurality of concave portions along the axial length direction but also of micro irregularities 31h protruding in the radial direction over the circumferential direction as shown in FIG. 26 (in this example, they are continuously formed over the entire circumference of 360°). Such micro irregularities 31h may be formed over the entire surface of the inclined surface 31A, but may also be formed in the vicinity of the rising position P1, preferably at a position including the rising position P1. Further, such a rough surface portion may be formed to have irregularities of about 0.5 to 5 μm in height, and it is possible to effectively alleviate stress because bending stress acts on the joint area of the socket-and-spigot joint 80 following the deflection of the small-diameter rod caused by forming a rough surface portion including such micro irregularities 31h, which causes large convex portions of the irregularities to be deformed (squashed) and come in contact with the outer peripheral surface of the socket-and-spigot joint 80.

The rough surface portion 31M may have either of the above-mentioned concave portions (micro grooves) and micro irregularities, but stress can be effectively alleviated by having both configurations. Then, since when fitting the small-diameter rod 30 into the socket-and-spigot joint 80, micro irregularities are deformed in the area where the rod is fixed as a result of formation of the rough surface portion 31M referred to above in the vicinity of the rising position P1, which makes it possible to correctly and accurately adjust the position. That is, the length of the portions exposed between the rods to be joined (the portions indicated by the length I in FIG. 18) can be easily made substantially uniform at all the socket-and-spigot joints, and the appearance can be improved.

Figure 27:
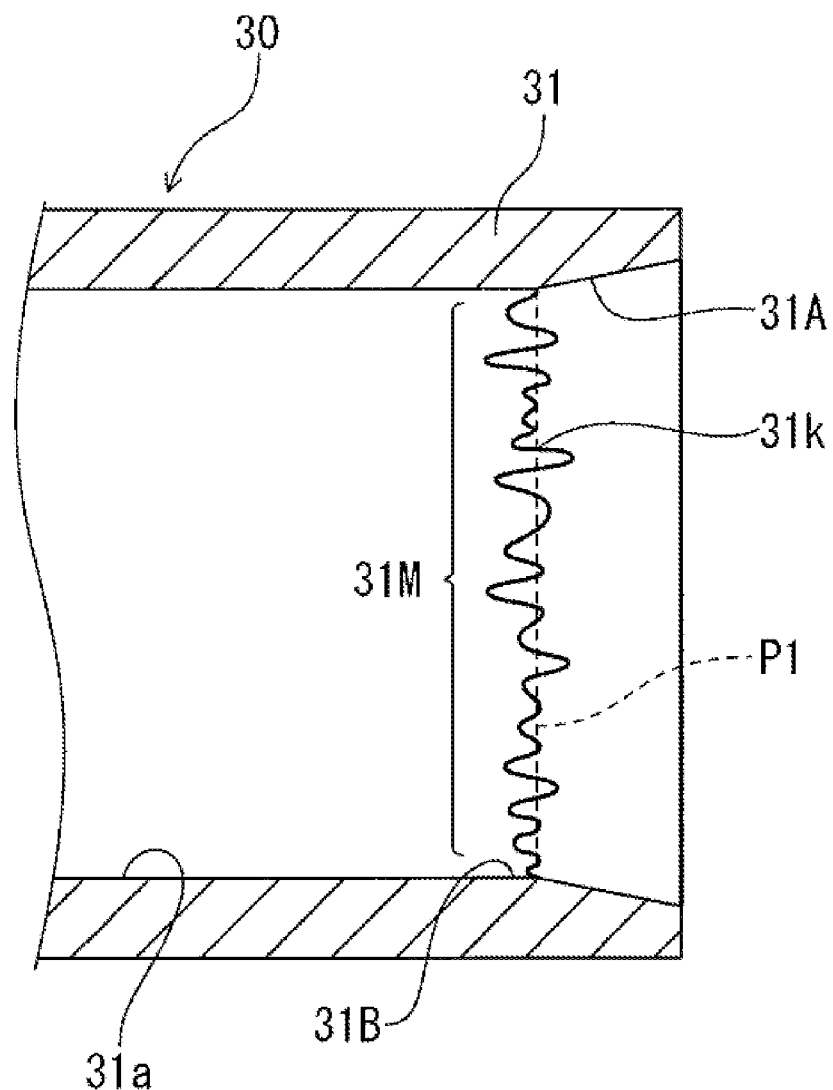
FIG. 27 shows a cross section diagram illustrating a variation of a rough surface portion at a joint of a small-diameter rod.

FIG. 27 is a cross section diagram illustrating a modification example of a rough surface portion.

The rough surface portion 31M' according to this example is composed of a number of micro grooves 31k extending in the axial direction that are continuously formed over the entire circumference of 360°. Such a number of micro grooves 31k are randomly formed along the axial direction in the vicinity of the rising position P1, which include those extending from the rising position P1 to the distal end side, those extending from the rising position P1 to the rear end side and those formed across the rising position P1, and the width, depth and length of each groove is unevenly formed.

Even in such a configuration, it is possible to effectively alleviate stress concentration when the small-diameter rod 30 bends.

The rough surface portions 31M and 31M' as described above can be formed at the time of rod molding by roughening the corresponding surface area of the metal core (mandrel) when the tubular small-diameter rod 30 is molded. Alternatively, they may also be formed by blasting a molded rod, or by inserting a machining tool (e.g., tapered reamer and pin reamer) into an opening, or with a combination of the above methods as appropriate. In this example, it is possible to change the depth, length and width, and the height of the irregularities by changing, for example, the degree of roughness of the surface of the machining tool, and the machining direction as appropriate, or a rough surface portion may be formed in a plurality of steps. In addition, the rough surface portion as described above may also be covered by waterproof or water-repellent coating as necessary.

The examples have been described above. However, this disclosure is not limited to the above-described examples, and various variations may be made.

In this example, the rising position P1 is formed inside a small-diameter rod, but the position is not limited thereto. Therefore, the rear end edge of the small-diameter rod may be subjected to the roughening treatment as described above without forming an inclined surface. Further, the inclined surface 31A shown in this example is constituted of a single surface gradually expanding in diameter toward the rear end, but may also be composed of a plurality of surfaces, or include a curved surface. A plurality of rising positions P1 may exist on the inner peripheral surface of the small-diameter rod.

Further, the inclined surface 31A as described above has been described by illustrating a small-diameter rod, but it is preferable to form the same on the inner surface of the opening of the distal end portion 32 of the large-diameter rod 30. Further, the above-mentioned configuration for alleviating stress concentration can also be applied to a joint of an ordinarily jointed type.

That is, an ordinarily jointed type fishing rod has a structure in which the rear end of the small-diameter rod is press-fitted and fixed to the inner peripheral surface of the opening on the distal end side of the large-diameter rod. It suffices that a rising position similar to that according to the above-described example is formed on the inner peripheral surface of the opening on the distal end side of the large-diameter rod, around which a rough surface portion having micro irregularities protruding in the radial direction over the circumferential direction and/or a number of micro grooves extending in the axial direction over the circumferential direction is formed.

In this example, when a rising position is formed inside the inner peripheral surface of the opening on the distal end side of the large-diameter rod, the inner peripheral surface of the opening is provided with a inclined surface that expands in diameter by a constant axial length from the rising position toward the distal end side, and that is inclined with respect to the central axis of the small-diameter rod to have a gap with the outer peripheral surface on the rear end side of the small-diameter rod. The rising position is a position at which the inclined surface comes in contact with the outer peripheral surface on the rear end side of the small-diameter rod, but a rough surface portion is preferably formed to include the rising position similarly to the above-mentioned socket-and-spigot jointed type fishing rod. Further, if an inclined surface is formed on the inner peripheral surface of the opening on the distal end side of the large-diameter rod, the rough surface portion may also be formed over the entire surface of the inclined surface to facilitate machining.

The dimension, material and arrangement of each component described herein are not limited to those explicitly described in the examples, and each component can be modified to have any dimension, material and arrangement that can be included within the scope of this disclosure. Further, components that are not explicitly described herein may be added to the described examples, or some of the components described in each example may also be omitted.

This application claims priority from Japanese Patent Application No. 2018-202757 (filed on Oct. 29, 2018), Japanese Patent Application No. 2018-243805 (filed on Dec. 26, 2018), and Japanese Patent Application No. 2019-004805 (filed on Jan. 16, 2019), the subject matter of which are incorporated herein by reference.

What is claimed is:

1. A fishing rod comprising
a hollow rod extending from a first end to a second end along a central axis of the hollow rod; and
a shaft member with an outer peripheral surface inclined with respect to the central axis inserted into the hollow rod from the first end, and that is supported by an inner peripheral surface of the hollow rod at a support position on the inner peripheral surface,
wherein the inner peripheral surface of the hollow rod defines a virtual curve extending between the support position and an end position of the inner peripheral surface at the first end,
wherein the inner peripheral surface of the hollow rod has at least one convex portion protruding toward the central axis from the virtual curve,
wherein the end position is disposed radially outward from the support position, and
wherein a virtual line extending between the end position and the support position on the inner peripheral surface is inclined with respect to the central axis at a first angle greater than a second angle between the outer peripheral surface of the shaft member and the central axis such that an open space is formed between the inner peripheral surface of the hollow rod and the outer peripheral surface of the shaft member that is adjacent to the inner peripheral surface of the hollow rod on both axial sides of the support position.

2. The fishing rod according to claim 1, wherein the inner peripheral surface of the hollow rod has a plurality of convex portions protruding toward the central axis from the virtual curve between the support position and the end position in the axial direction.

3. The fishing rod according to claim 1, wherein the inner peripheral surface of the hollow rod has at least one concave portion that is concave toward an opposite side of the central axis from the virtual curve between the support position and the one position in the axial direction.

4. The fishing rod according to claim 3, wherein the inner peripheral surface of the hollow rod has a plurality of concave portions that are concave toward the opposite side of the central axis from the virtual curve between the support position and the end position in the axial direction.

5. The fishing rod according to claim 1, wherein the inner peripheral surface of the hollow rod has a parallel surface extending parallel or substantially parallel to the central axis from the support position to the other end side.

6. The fishing rod according to claim 1,
wherein the hollow rod includes: a stress relieving layer containing first reinforced fibers that is provided on a radially innermost side; and a main body layer containing second reinforced fibers that is provided radially outward from the stress relieving layer, and
wherein a tensile modulus of elasticity of the first reinforced fibers is smaller than that of the second reinforced fibers.

7. A fishing rod comprising:
a hollow rod extending from a first end to a second end along a central axis of the hollow rod; and
a shaft member with an outer peripheral surface inclined at a first angle with respect to the central axis that is inserted into the hollow rod from the first end,
wherein an inner peripheral surface of the hollow rod has:
a first surface extending at an inclination angle greater than the first angle with respect to the central axis from the first end to a first position in the axial direction,
a second surface extending from the first position to a second position in the axial direction, and
a third surface extending parallel or substantially parallel to the central axis from the second position to a third position in the axial direction; and
wherein the second surface has:
an inclined portion continuous with the first surface and is inclined at an angle greater than the first angle with respect to the central axis, and
a non-inclined portion continuous with the third surface and extending parallel or substantially parallel to the central axis.

8. The fishing rod according to claim 7, wherein a length in a circumferential direction around the central axis at the first position of the non-inclined portion is 50% or more of a total length of the inner peripheral surface at the second position.

9. The fishing rod according to claim 7, wherein a length in the central axis direction of the first surface is equal to or greater than a length in the central axis direction of the second surface.

10. The fishing rod according to claim 7 further comprising:
a fishing line guide provided on the outer peripheral surface of the hollow rod,
wherein the inclined portion is provided on the opposite side of the location of the fishing line guide in the circumferential direction around the central axis.

11. The fishing rod according to claim 7,
wherein the hollow rod is provided with a fishing line guide, and
wherein the inclined portion is provided on a side of the location of the fishing line guide in the circumferential direction around the central axis.

12. The fishing rod according to claim 1, wherein the shaft member is a socket-and-spigot core member.

13. The fishing rod according to claim 1, wherein the shaft member is another hollow rod with a diameter smaller than that of the hollow rod.

* * * * *